United States Patent
Shim

(10) Patent No.: US 11,575,846 B2
(45) Date of Patent: Feb. 7, 2023

(54) IMAGE SENSOR CONFIGURED TO DYNAMICALLY ADJUST CONVERSION GAIN OF A PIXEL IN ACCORDANCE WITH EXPOSURE TIME

(71) Applicant: SAMSUNG ELECTRONICS CO., LTD., Suwon-si (KR)

(72) Inventor: Eun Sub Shim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/370,191

(22) Filed: Jul. 8, 2021

(65) Prior Publication Data

US 2021/0344856 A1 Nov. 4, 2021

Related U.S. Application Data

(63) Continuation of application No. 16/674,478, filed on Nov. 5, 2019, now Pat. No. 11,082,644.

(30) Foreign Application Priority Data

Apr. 15, 2019 (KR) ........................ 10-2019-0043573

(51) Int. Cl.
*H04N 5/353* (2011.01)
*H04N 5/341* (2011.01)
(Continued)

(52) U.S. Cl.
CPC ........... *H04N 5/3535* (2013.01); *H04N 5/341* (2013.01); *H04N 5/357* (2013.01); *H04N 5/3559* (2013.01);
(Continued)

(58) Field of Classification Search
CPC .. H04N 5/3535; H04N 5/341; H04N 5/35536; H04N 5/3559; H04N 5/357;
(Continued)

(56) References Cited

U.S. PATENT DOCUMENTS 9,332,200 B1 * 5/2016 Hseih .................. H04N 5/3765
9,344,647 B2   5/2016 Agranov et al.
(Continued)

FOREIGN PATENT DOCUMENTS

KR  10-2020-0075962  6/2020

*Primary Examiner* — Nhan T Tran
(74) *Attorney, Agent, or Firm* — F. Chau & Associates, LLC

(57) ABSTRACT

An image sensor including: a pixel array including a plurality of pixels connected to a plurality of row lines and a plurality of column lines, each of the plurality of pixels including a photodiode for generating an electric charge in response to light, and a pixel circuit having a floating diffusion for storing the electric charge; and a controller configured to adjust a capacitance of the floating diffusion to a first value and obtain a first pixel signal from the pixel circuit during a first time period, adjust the capacitance of the floating diffusion to a second value greater than the first value and obtain a second pixel signal from the pixel circuit during a second time period subsequent to the first time period, and generate a result image using the first pixel signal and the second pixel signal.

18 Claims, 25 Drawing Sheets

(51) Int. Cl.
  *H04N 5/355*  (2011.01)
  *H04N 5/357*  (2011.01)
  *H04N 5/3745* (2011.01)

(52) U.S. Cl.
  CPC ....... *H04N 5/35536* (2013.01); *H04N 5/3745* (2013.01)

(58) Field of Classification Search
  CPC .. H04N 5/3745; H04N 5/37457; H04N 5/369; H04N 5/378; H04N 5/35581; H04N 5/3692
  See application file for complete search history.

(56) References Cited

U.S. PATENT DOCUMENTS

| | | |
|---|---|---|
| 9,686,488 B2 | 6/2017 | Barna |
| 10,397,500 B1 * | 8/2019 | Xu .................... H04N 5/35563 |
| 2011/0309232 A1 * | 12/2011 | Lyu .................... H04N 5/35581 |
| | | 250/208.1 |
| 2016/0286108 A1 * | 9/2016 | Fettig ................. H04N 5/23245 |
| 2017/0041562 A1 * | 2/2017 | Solhusvik .......... H04N 5/35581 |
| 2017/0070691 A1 * | 3/2017 | Nishikido .......... H04N 5/37452 |
| 2017/0118424 A1 | 4/2017 | Lule et al. |
| 2017/0257580 A1 | 9/2017 | Barna |
| 2019/0189656 A1 * | 6/2019 | Mo .................... H04N 5/35563 |
| 2019/0378864 A1 * | 12/2019 | Innocent ................ H04N 5/374 |
| 2020/0195870 A1 | 6/2020 | Shim et al. |
| 2020/0227454 A1 * | 7/2020 | Geurts ................ H04N 5/3559 |
| 2020/0329206 A1 | 10/2020 | Shim |

* cited by examiner (a)

(b)

IMAGE SENSOR CONFIGURED TO DYNAMICALLY ADJUST CONVERSION GAIN OF A PIXEL IN ACCORDANCE WITH EXPOSURE TIME

CROSS-REFERENCE TO RELATED APPLICATION(S)

This application is a continuation of U.S. patent application Ser. No. 16/674,478 filed on Nov. 5, 2019, which claims priority under 35 U.S.C. § 119 to Korean Patent Application No. 10-2019-0043573 filed on Apr. 15, 2019 in the Korean Intellectual Property Office, the disclosures of which are incorporated by reference herein in their entireties.

TECHNICAL FIELD

Exemplary embodiments of the present inventive concept relate to an image sensor.

DISCUSSION OF RELATED ART

An image sensor is a semiconductor-based sensor for receiving light and generating an electrical signal. For example, an image sensor converts light into an electrical signal that conveys information used to make an image. An image sensor may include a pixel array including a plurality of pixels, a logic circuit for driving the pixel array and generating an image, and the like. The plurality of pixels may include a photodiode for generating an electric charge by reacting to external light, a pixel circuit for converting the electrical charge generated by the photodiode into an electrical signal, and the like. An image sensor was traditionally employed in cameras for capturing still and video images, but is now widely applied to smartphones, tablet personal computers (PCs), laptop computers, televisions, vehicles, and the like. Recently, a variety of methods for resolving noise properties and improving a dynamic range, and the like, of an image sensor have been developed.

SUMMARY

According to an exemplary embodiment of the present inventive concept, there is provided an image sensor including: a pixel array including a plurality of pixels connected to a plurality of row lines and a plurality of column lines, each of the plurality of pixels including a photodiode for generating an electric charge in response to light, and a pixel circuit having a floating diffusion for storing the electric charge; and a controller configured to adjust a capacitance of the floating diffusion to a first value and obtain a first pixel signal from the pixel circuit during a first time period, adjust the capacitance of the floating diffusion to a second value greater than the first value and obtain a second pixel signal from the pixel circuit during a second time period subsequent to the first tune period, and generate a result image using the first pixel signal and the second pixel signal.

According to an exemplary embodiment of the present inventive concept, there is provided an image sensor including: a photodiode for generating an electric charge in response to light during an exposure time; a floating diffusion storing the electric charge; a reset transistor connected between a power node for supplying a power voltage and the floating diffusion; and a switch device connected between the reset transistor and the floating diffusion, wherein the switch device is turned off when the exposure time is longer than a reference time, and the switch device is turned on when the exposure time is shorter than the reference time.

According to an exemplary embodiment of the present inventive concept, there is provided an image sensor including: a pixel array including a plurality of pixels, each of the plurality of pixels including a photodiode, and a pixel circuit for outputting a reset voltage and a pixel voltage using an electric charge generated from the photodiode; and a controller configured to adjust a conversion gain of the pixel circuit in accordance with an exposure time of the photodiode while the pixel circuit outputs the reset voltage and the pixel voltage, wherein the controller generates a result image using a first reset voltage and a first pixel voltage output from the pixel circuit when the conversion gain is a first value, and the controller generates the result image using a second reset voltage and a second pixel voltage output from the pixel circuit when the conversion gain is a second value different from the first value.

BRIEF DESCRIPTION OF DRAWINGS

The above and other features of the present inventive concept will be more clearly understood by describing in detail exemplary embodiments thereof in conjunction with the accompanying drawings, in which.

DETAILED DESCRIPTION OF THE EMBODIMENTS

Figure 1:
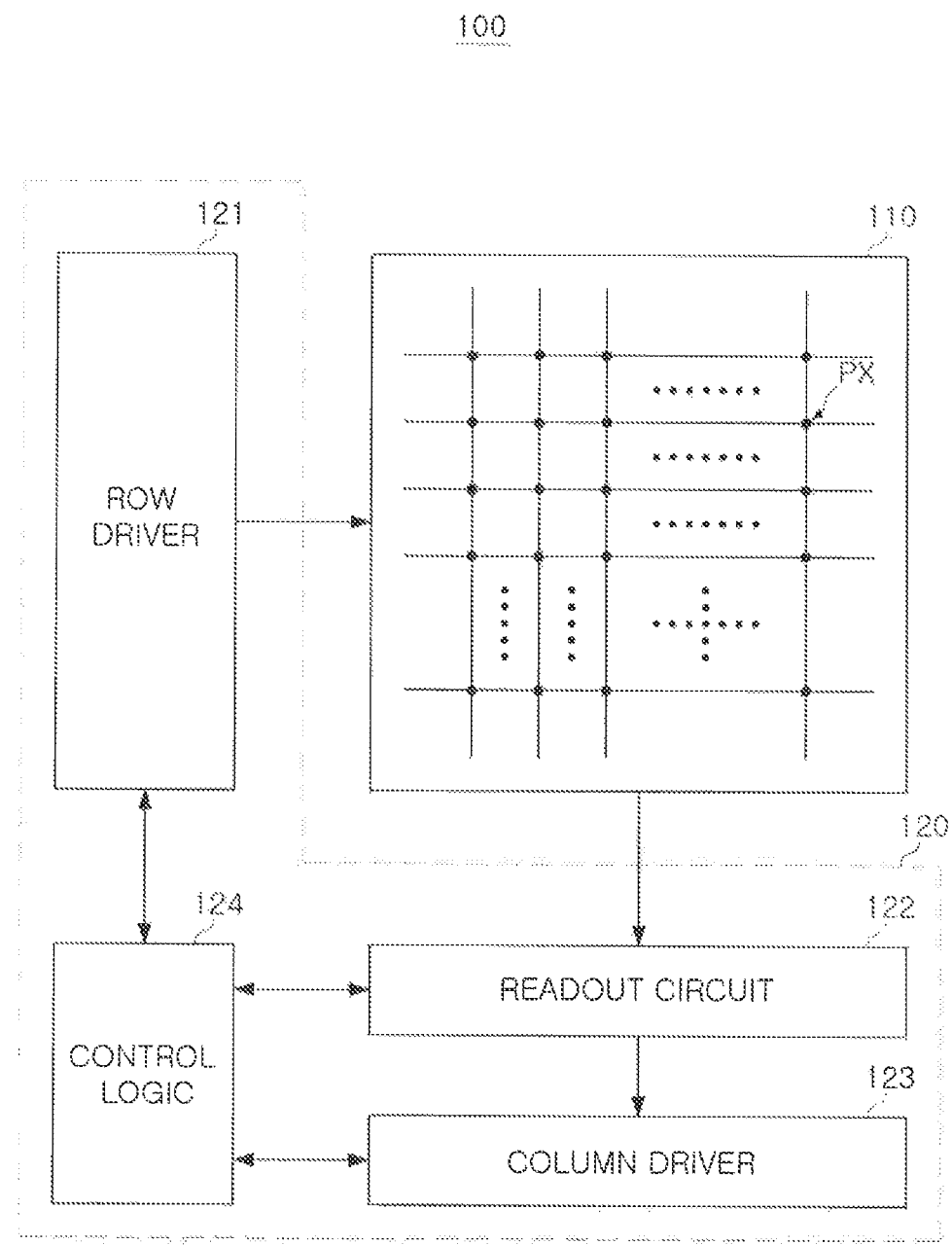
FIG. 1 is a block diagram illustrating an image sensor according to an exemplary embodiment of the present inventive concept.

Hereinafter, exemplary embodiments of the present inventive concept will be described with reference to the accompanying drawings. Like reference numerals may refer to like elements in the drawings.

FIG. 1 is a block diagram illustrating an image sensor according to an exemplary embodiment of the present inventive concept.

Referring to FIG. 1, an image sensor 100 in the present embodiment may include a pixel array 110 and a controller 120. The controller 120 may include a row driver 121, a readout circuit 122, a column driver 123, a control logic 124, and others.

The image sensor 100 may convert light received from an external source into an electrical signal and may generate image data. The pixel array 110 included in the image sensor 100 may include a plurality of pixels PX. The plurality of pixels PX may include a photoelectric device for receiving light and generating an electric charge. The photoelectric device may be, a photodiode (PD), for example. The plurality of pixels PX may be connected to a plurality of row lines extending in a first direction and a plurality of column lines extending in a second direction. In an exemplary embodiment of the present inventive concept, each of the plurality of pixels PX may include two or more photodiodes. Two or more photodiodes may be included in each of the plurality of pixels PX to generate pixel signals corresponding to a variety of colors of light or to provide an autofocusing function.

Each of the plurality of pixels PX may include a pixel circuit for generating a pixel signal from an electric charge generated by the photodiodes. As an example, the pixel circuit may include a transfer transistor, a driving transistor, a selection transistor, a reset transistor, a floating diffusion, and others. The pixel circuit may output a reset voltage and a pixel voltage. The pixel voltage may correspond to an electric charge generated from the photodiodes included in each of the plurality of pixels PX and stored in the floating diffusion. In an exemplary embodiment of the present inventive concept, two or more adjacent pixels PX may form a single pixel group, and two or more pixels PX included in a pixel group may share at least one of a transfer transistor, a driving transistor, a selection transistor, and a reset transistor.

In an exemplary embodiment of the present inventive concept, a capacitance of the floating diffusion included in the pixel circuit may be adjusted. As an example, a capacitance of the floating diffusion may be adjusted in accordance with a length of an exposure time in which the pixels PX are exposed to light. Accordingly, when an electric charge stored in the floating diffusion is converted into a voltage, a conversion gain appropriate for an exposure time may be applied. In this case, noise properties, a dynamic range, and the like, of the image sensor 100 may improve.

The row driver 121 may drive the pixel array 110 by inputting a driving signal to a plurality of row lines. For example, the driving signal may include a transfer control signal for controlling a transfer transistor of each pixel PX, a reset control signal for controlling a reset transistor of each pixel PX, a selection control signal for controlling a selection transistor of each pixel PX, and the like. As an example, the row driver 121 may sequentially drive the plurality of row lines.

The readout circuit 122 may include a sampling circuit, an analog-to-digital converter (ADC), and the like. The sampling circuit may include a plurality of samplers connected to the pixels PX through a plurality of column lines, and in an exemplary embodiment of the present inventive concept, the sampler may be a correlated double sampler (CDS). The sampler may detect a reset voltage and a pixel voltage from the pixels PX connected to a selected row line driven by the row driver 121 among the plurality of row lines. The samplers may compare each of the reset voltage and the pixel voltage with a ramp voltage, and may output the result of the comparison. The analog-to-digital converter may convert the comparison result output from the samplers into a digital signal and may output the digital signal.

The column driver 123 may include a latch for temporarily storing a digital signal, an amplifier circuit, and the like, and may process a digital signal received from the readout circuit 122. The row driver 121, the readout circuit 122, and the column driver 123 may be controlled by the control logic 124. The control logic 124 may include a timing controller for controlling operational timings of the row driver 121, the readout circuit 122, and the column driver 123, an image signal processor for processing image data, and others. In exemplary embodiments of the present inventive concept, the image signal processor may also be included in an external processor connected to the image sensor 100 for communication.

Figure 2:
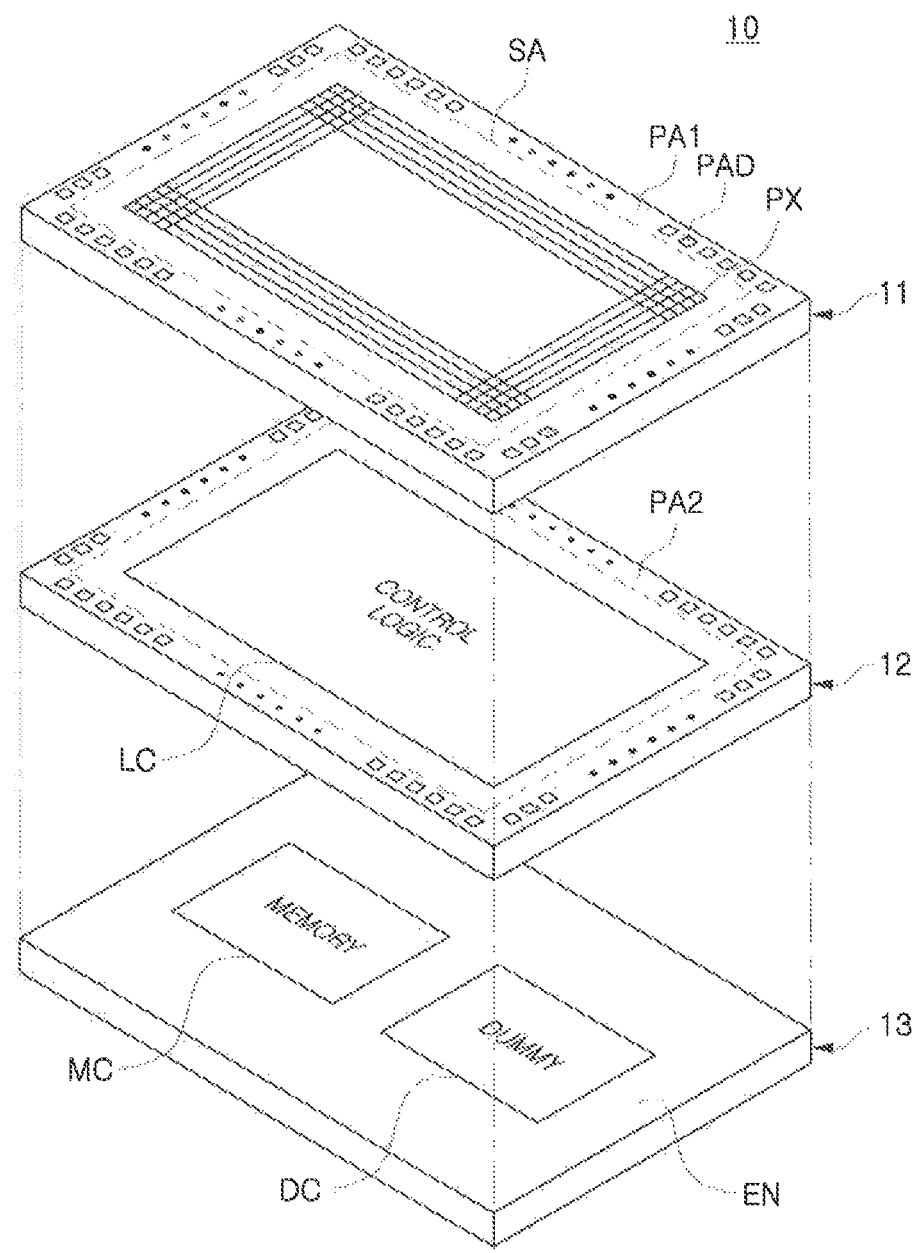
FIGS. 2 and 3 are diagrams illustrating an image sensor according to exemplary embodiments of the present inventive concept.
Figure 3:
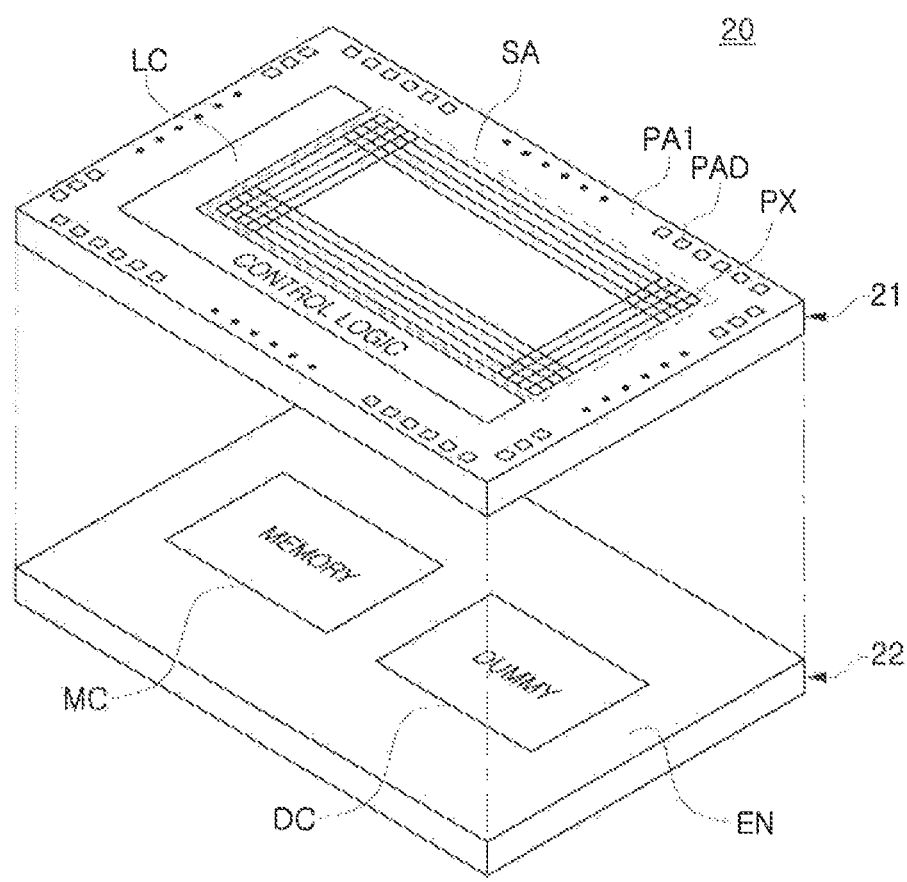

FIGS. 2 and 3 are diagrams illustrating an image sensor according to exemplary embodiments of the present inventive concept.

Referring to FIG. 2, an imaging device 10 in the present embodiment may include a first layer 11, a second layer 12 arranged in a lower portion of the first layer 11, and a third layer 13 arranged in a lower portion of the second layer 12, and the like. In other words, the second layer 12 may be disposed below the first layer 11, and the third layer 13 may be disposed below the second layer 12. The first layer 11, the second layer 12, and the third layer 13 may be layered in a vertical direction. In an exemplary embodiment of the present inventive concept, the first layer 11 and the second layer 12 may be layered on a wafer level, and the third layer 13 may be attached to a lower portion of the second layer 12 on a chip level. The first to third layers 11 to 13 may be provided as a single semiconductor package.

The first layer 11 may include a sensing area SA in which a plurality of pixels PX are arranged, and a first pad region PA1 arranged around the sensing area SA. The first pad region PA1 may include a plurality of upper pads PAD, and the plurality of upper pads PAD may be connected to pads and a control logic LC arranged in a second pad region PA2 of the second layer 12 through a via.

Each of the plurality of pixels PX may include a photodiode for receiving light and generating an electric charge, and a pixel circuit for processing the electric charge generated from the photodiode, and others. The pixel circuit may include a plurality of transistors for outputting a voltage corresponding to the electric charge generated from the photodiode.

The second layer 12 may include a plurality of devices providing the control logic LC. The plurality of devices included in the control logic LC may provide circuits for driving a pixel circuit arranged on the first layer 11, such as a row driver, a column driver, a timing controller, and the like, for example. The plurality of devices included in the control logic LC may be connected to a pixel circuit through the first and second pad regions PA1 and PA2. The control logic LC may obtain a reset voltage and a pixel voltage from the plurality of pixels PX, and may generate a pixel signal.

In an exemplary embodiment of the present inventive concept, at least one of the plurality of pixels PX may include a plurality of photodiodes disposed on the same level. Pixel signals generated from an electric charge of each of the plurality of photodiodes may have a phase difference between the pixel signals. The control logic LC may provide an autofocusing function based on phase differences of the pixel signals generated from the plurality of photodiodes included in a single pixel PX.

The third layer 13 arranged in a lower portion of the second layer 12 may include a memory chip MC, a dummy chip DC, and a protective layer EN for sealing the memory chip MC and the dummy chip DC. The memory chip MC may be a dynamic random access memory (DRAM) or a static random access memory (SRAM). The dummy chip DC may not actually store data. The memory chip MC may be electrically connected to at least some of the devices included in the control logic LC of the second layer 12 by a bump, and may store information for providing an autofocusing function. In an exemplary embodiment of the present inventive concept, the bump may be a micro-bump.

Referring to FIG. 3, an imaging device 20 in the present embodiment may include a first layer 21 and a second layer 22. The first layer 11 may include a sensing area SA in which a plurality of pixels PX are arranged, a control logic LC in which devices for driving the plurality of pixels PX are arranged, and a first pad region PA1 arranged around the sensing area SA and the control logic LC. The first pad region PA1 may include a plurality of upper pads PAD, and the plurality of upper pads PAD may be connected to a memory chip MC arranged on the second layer 22 through a via, and the like. The second layer 22 may include a memory chip MC, a dummy chip DC, and a protective layer EN for sealing the memory chip MC and the dummy chip DC.

Figure 4:
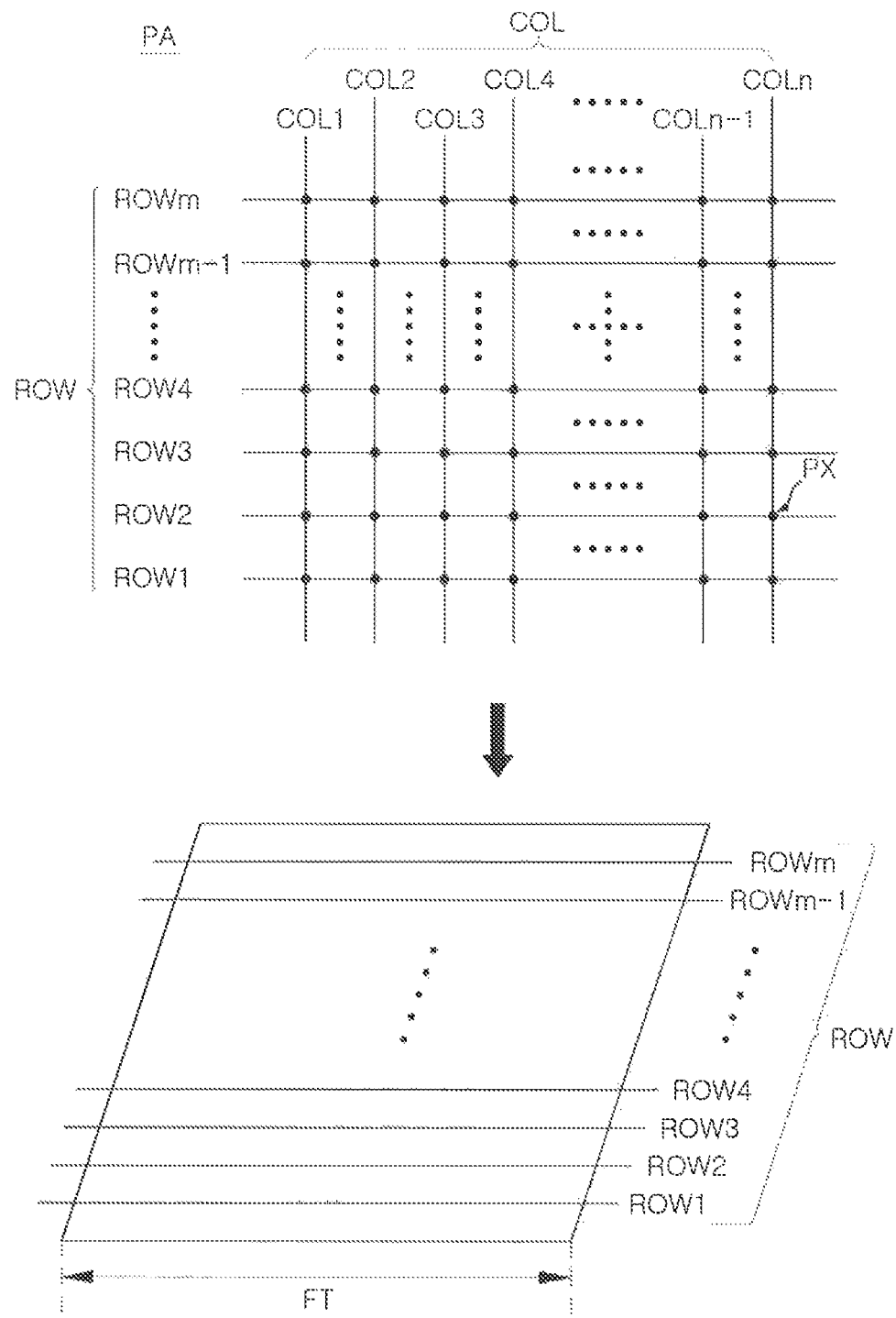
FIG. 4 is a diagram illustrating an operation of an image sensor according to an exemplary embodiment of the present inventive concept.

FIG. 4 is a diagram illustrating an operation of an image sensor according to an exemplary embodiment of the present inventive concept.

Referring to FIG. 4, a pixel array PA of an image sensor in the present embodiment may include a plurality of pixels PX. The plurality of pixels PX may be connected to a plurality of row lines ROW1 to ROWm (ROW), and a plurality of column lines COL1 to COLn (COL). The image sensor may drive the plurality of pixels PX in unit of a plurality of row lines ROW. As an example, a time for driving a selected driving line among the plurality of row lines ROW and reading out a reset voltage and a pixel voltage from pixels PX connected to the selected driving line may be a single horizontal period. An image sensor may operate in a rolling shutter method which sequentially drives the plurality of row lines ROW.

A frame period FT of the image sensor may be each of time periods for reading out a reset voltage and a pixel voltage from all the pixels included in a pixel array PA. As an example, the frame period FT may be the same as or greater than a product obtained by multiplying the number of the plurality of row lines ROW by the horizontal period. The shorter the frame period FT of the image sensor, the higher number of image frames the image sensor may generate during the same period of time.

Figure 5:
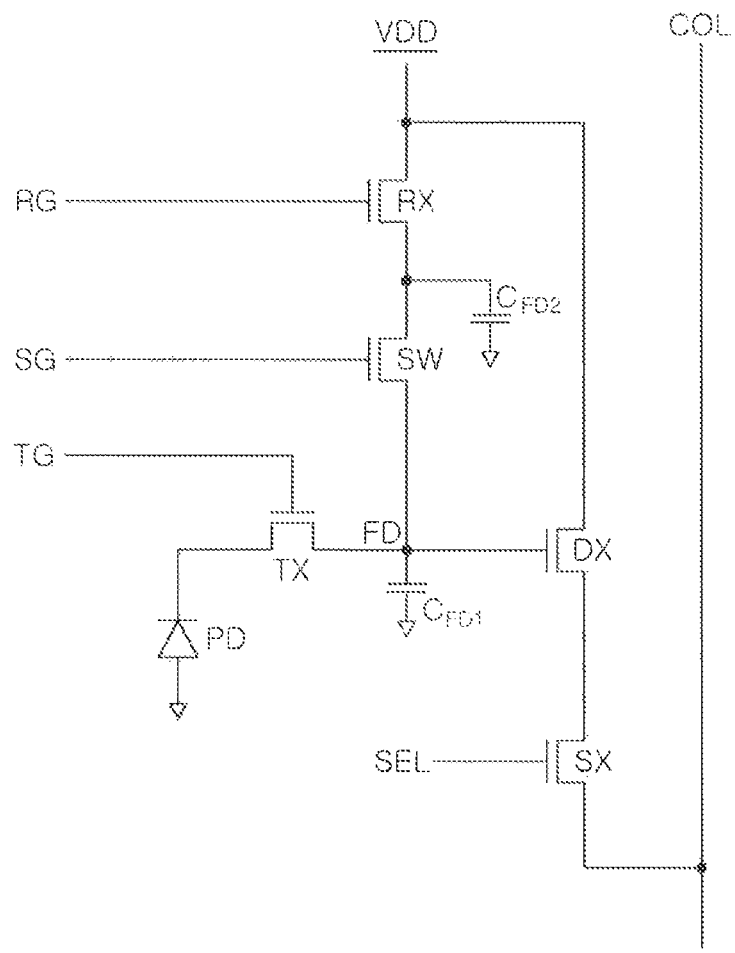
FIG. 5 is a circuit diagram illustrating a pixel included in an image sensor according to an exemplary embodiment of the present inventive concept.

FIG. 5 is a circuit diagram illustrating a pixel included in an image sensor according to an exemplary embodiment of the present inventive concept.

Referring to FIG. 5, a pixel included in an image sensor may include a photodiode PD for generating an electric charge in response to light, a pixel circuit for processing the electric charge generated from the photodiode PD and outputting an electrical signal, and others. As an example, the pixel circuit may include a floating diffusion FD, a reset transistor RX, a driving transistor DX, a selection transistor SX, a transfer transistor TX, a switch device SW, and the like.

The reset transistor RX may be connected between a power node supplying a power voltage VDD and a floating diffusion FD, and may be controlled by a reset control signal RG. As an example, when the reset transistor RX and the switch device SW are turned on, a voltage of the floating diffusion FD may be reset to the power voltage VDD. When voltage of the floating diffusion FD is reset, the selection transistor SX may be turned on by a selection control signal SEL and a reset voltage may be output to a column line COL.

In an exemplary embodiment of the present inventive concept, the photodiode PD may generate electrons or holes as a main charge carrier in response to light. When the transfer transistor TX is turned on after the reset voltage is output to the column line COL, the electric charge generated by the photodiode PD exposed to light may move to the floating diffusion FD. The driving transistor DX may operate as a source-follower amplifier which amplifies the voltage of the floating diffusion FD, and when the selection transistor SX is turned on by the selection control signal SEL, a pixel voltage corresponding to the electric charge generated by the photodiode PD may be output to the column line COL.

Each of a reset voltage and a pixel voltage may be detected by a sampling circuit connected to the column line COL. The sampling circuit may include a plurality of samplers having a first input terminal and a second input terminal, and the sampler may receive a ramp voltage through the first input terminal. The sampler may compare the ramp voltage input to the first input terminal with a reset voltage and a pixel voltage input to the second input terminal. An analog-to-digital converter (ADC) may be connected to an output terminal of the sampler, and the analog-to-digital converter may output reset data corresponding to a result of the comparison between the ramp voltage and the reset voltage. The analog-to-digital converter may also output pixel data corresponding to a result of the comparison between the ramp voltage and the pixel voltage. The control logic may generate image data using a pixel signal corresponding to a difference between the reset data and the pixel data.

A level of the pixel voltage may be determined based on the amount of an electric charge generated by the photodiode PD and moved to the floating diffusion FD, a conversion gain of the pixel circuit, and the like. A conversion gain of the pixel circuit may correspond to a voltage change generated by the electric charge, and may be inversely proportional to a capacitance of the floating diffusion. Thus, when the capacitance of the floating diffusion increases, a conversion gain of the pixel circuit may decrease, and when the capacitance of the floating diffusion decreases, a conversion gain of the pixel circuit may increase.

A conversion gain may affect performance of the image sensor. As an example, when a conversion gain of the pixel circuit is set for a low illumination environment, and a pixel voltage generated in a high illumination environment exceeds a dynamic range of the image sensor, the quality of an image may be deteriorated. When a conversion gain of the pixel circuit is set for a high illumination environment, the driving transistor DX may not be sufficiently driven in a low illumination environment, and accordingly, the quality of an image may be deteriorated.

To address the issue just described above, in an exemplary embodiment of the present inventive concept, a conversion gain of the pixel circuit may be dynamically adjusted by turning on or turning off the switch device SW. For example, whether to turn on or turn off the switch device SW may be determined in consideration of a length of an exposure time in which the photodiode PD is exposed to light, after which a pixel signal may be obtained, and a result image may be generated using pixel signals obtained in different exposure times. Thus, noise properties, a dynamic range, and the like, of the image sensor may improve.

As an example, when the switch device SW is turned off, a capacitance of the floating diffusion FD storing an electric charge generated from the photodiode PD may be determined as a first capacitance $C_{FD1}$. When the switch device SW is turned on, the capacitance of the floating diffusion FD may be determined as a sum of the first capacitance $C_{FD1}$ and a second capacitance $C_{FD2}$. Thus, by turning off the switch device SW, the capacitance of the floating diffusion FD may decrease and a conversion gain may increase, and by turning on the switch device SW, the capacitance of the floating diffusion FD may increase and a conversion gain may decrease. As an example, the switch device SW may be turned off when an exposure time is relatively long, and the switch device SW may be turned on when an exposure time is relatively short.

Figure 6:
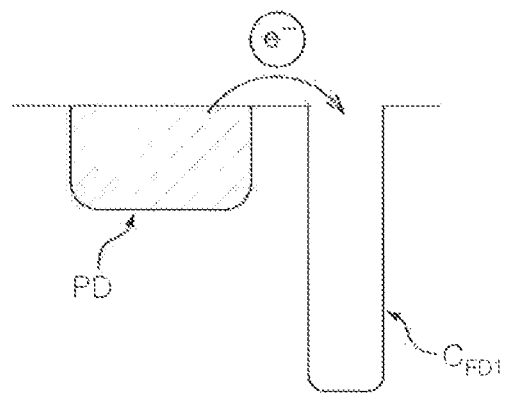
FIG. 6 is a diagram illustrating an operation of adjusting a conversion gain of a pixel in an image sensor according to an exemplary embodiment of the present inventive concept.
Figure 6:
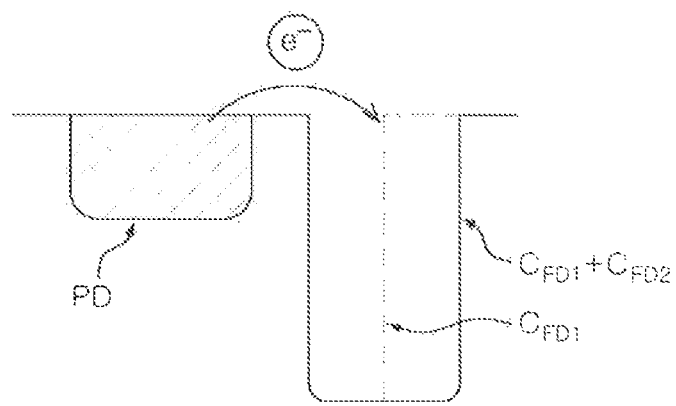

FIG. 6 is a diagram illustrating an operation of adjusting a conversion gain of a pixel in an image sensor according to an exemplary embodiment of the present inventive concept.

Images (a) and (b) in FIG. 6 are diagrams illustrating an operation of a pixel circuit under conditions of a relatively high conversion gain and a relatively low conversion gain. In the description below, an example embodiment of the present inventive concept will be described with reference to the pixel circuit described in FIG. 5 for ease of description.

Image (a) in FIG. 6 illustrates an example in which a switch device SW included in a pixel circuit is turned off. As the switch device SW is turned off, a capacitance of a floating diffusion FD may be determined as a first capacitance $C_{FD1}$. Image (b) in FIG. 6 illustrates an example in which the switch device SW is turned on. In this case, the capacitance of the floating diffusion FD may be determined as a sum of the first capacitance $C_{FD1}$ and a second capacitance $C_{FD2}$. Thus, by turning off the switch device SW, a conversion gain of the pixel circuit may increase, and by turning on the switch device SW, a conversion gain of the pixel circuit may decrease.

To increase the quality of a result image output by an image sensor, an exposure time of the photodiode PD may be set differently, and a plurality of pixel signals may be obtained from the pixel circuit, to thereby generate a result image. As an example, an exposure time may be lengthened such that an obtained pixel signal may be applied to an area in which light is insufficient, and a pixel signal of which an exposure time is shortened may be applied to an area in which light is sufficient, thereby increasing the quality of a result image.

In the present embodiment, when an exposure time is lengthened, the switch device SW may be turned off, and when an exposure time is shortened, the switch device SW may be turned on. Thus, a pixel circuit may operate under a condition of a conversion gain appropriate for an exposure time, and noise properties and a dynamic range of the image sensor may improve, thereby increasing the quality of a result image.

Figure 7:
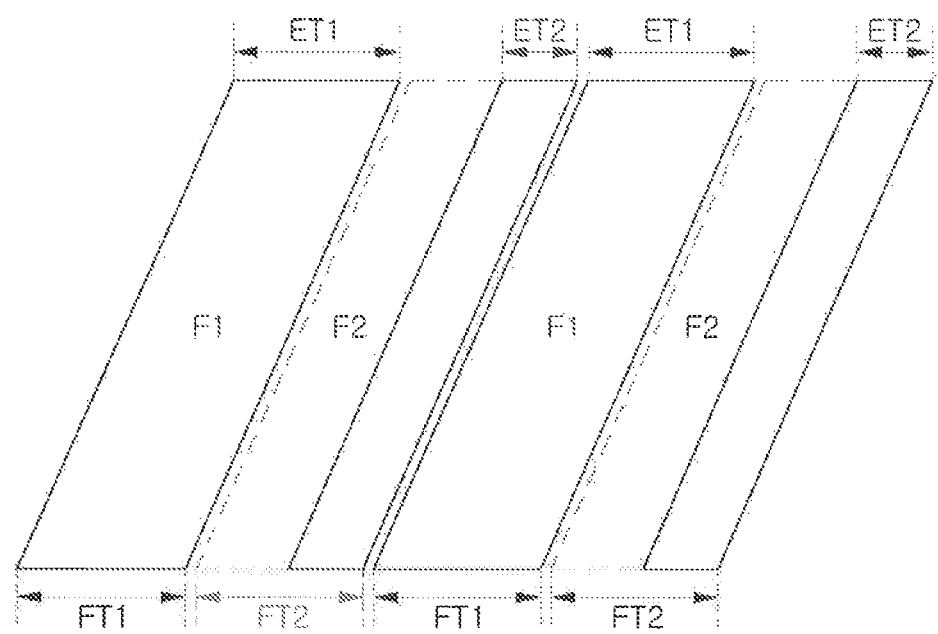
FIG. 7 is a diagram illustrating an operation of an image sensor according to an exemplary embodiment of the present inventive concept.
Figure 8:
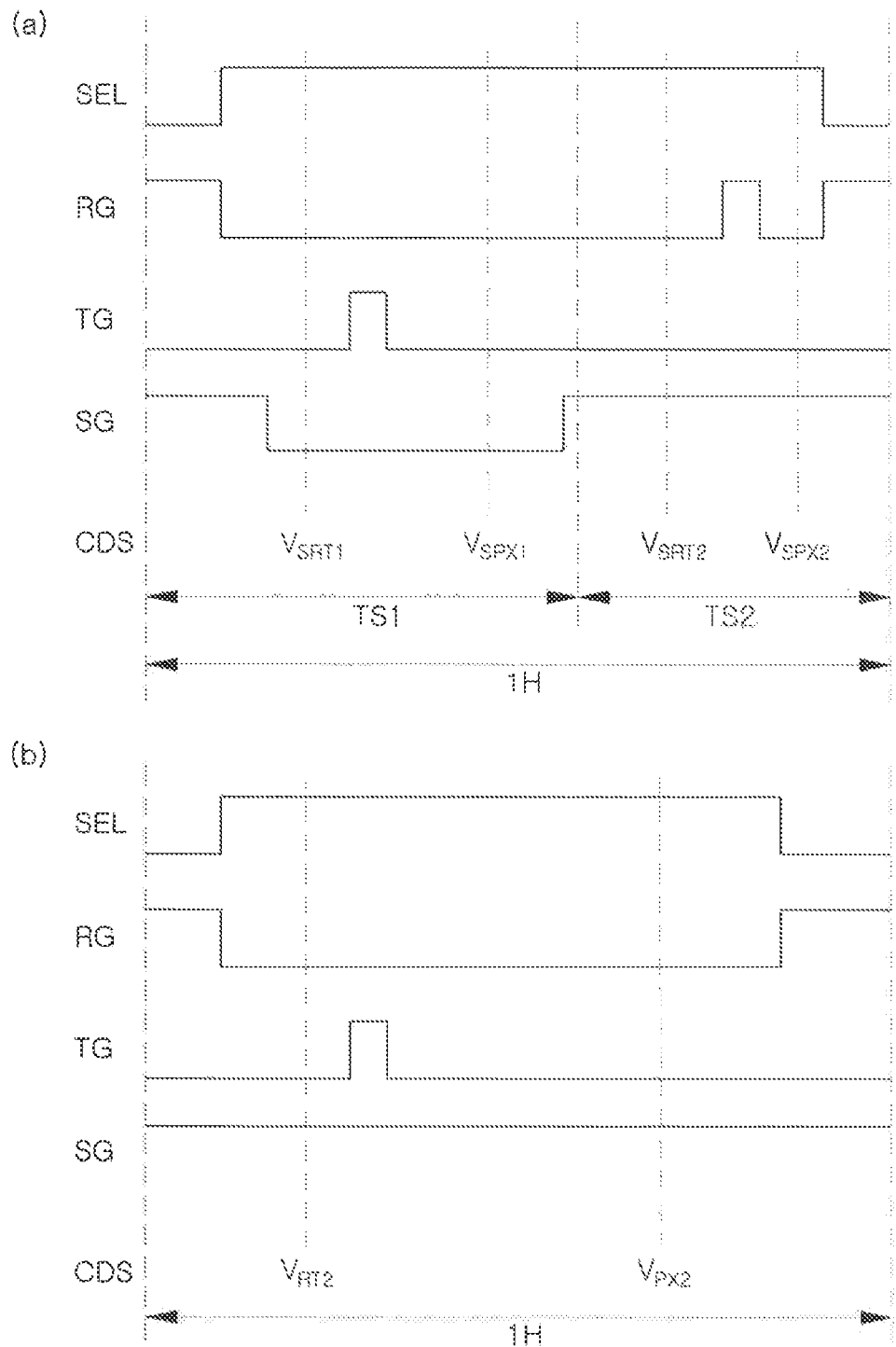
FIGS. 8 and 9 are diagrams illustrating an operation of an image sensor according to exemplary embodiments of the present inventive concept.
Figure 9:
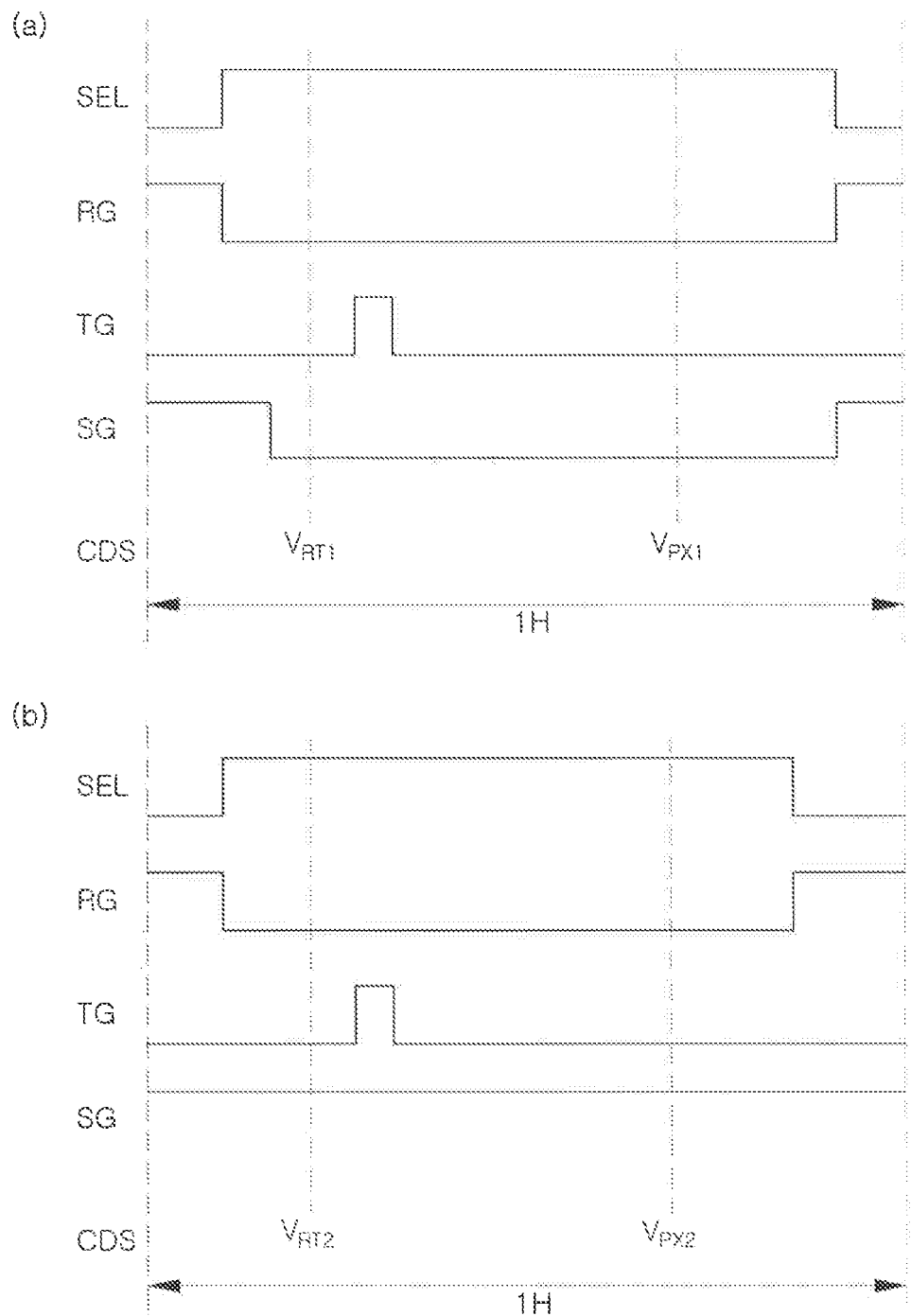

FIG. 7 is a diagram illustrating an operation of an image sensor according to an exemplary embodiment of the present inventive concept. FIGS. 8 and 9 are diagrams illustrating an operation of an image sensor according to exemplary embodiments of the present inventive concept.

An image sensor in the present embodiment may generate image frames in each of a plurality of frame periods, and may generate a result image using the image frames. Referring to FIG. 7, the image sensor may drive a plurality of row lines included in a pixel array in accordance with predetermined frame periods FT1 to FT2, and may obtain pixel signals through a plurality of column lines included in the pixel array. F1 and F2 may refer to first and second image frames, for example.

The image sensor may control photodiodes of pixels to be exposed to light during a first exposure time ET1 in the first frame period FT1. The image sensor may obtain a first pixel signal corresponding to an electric charge generated from the photodiode during the first frame period FT1, and may generate a first image frame using the first pixel signal. In addition, the image sensor may control the photodiodes of pixels to be exposed to light during a second exposure time ET2 shorter than the first frame period FT1 in a second frame period FT2. When a second pixel signal corresponding to an electric charge generated from the photodiode is generated during the second exposure time ET2, the image sensor may generate a second image frame using the second pixel signal.

In the first image frame corresponding to the first exposure time ET1, a dark area may be relatively clearly displayed as compared to the second image frame. In addition, pixels corresponding to a bright area may be saturated, in the first image frame. In the second image frame corresponding to the second exposure time ET2, a bright area may be clearly displayed as pixels corresponding to the bright area are not saturated, and a dark area may not be clearly displayed. The image sensor may generate a result image in which both a bright area and a dark area are clearly displayed using the first image frame and the second image frame. For example, an image sensor may generate a result image by selecting a dark area in the first image frame and selecting a bright area in the second image frame. In other words, the result image may be generated by selecting the clearly displayed areas in the first and second image frames.

In addition, the image sensor according to an exemplary embodiment of the present inventive concept may adjust a conversion gain of each pixel differently when generating the first image frame and generating the second image frame. As an example, a conversion gain of each of pixels in the first frame period FT1 may have a first value, and a conversion gain of each of pixels in the second frame period FT2 may have a second value smaller than the first value. In addition, in an exemplary embodiment of the present inventive concept, the first frame period FT1 may be divided into two or more sub-time periods, and a conversion gain of each of pixels in each of the sub-time periods may be controlled to have a first value and a second value. In the sub-time periods, the first and second values may be different from each other. In the description below, exemplary embodiments of the present inventive concept will be described with reference to FIGS. 8 and 9.

The timing diagrams illustrated in FIGS. 8 and 9 may illustrate an operation during a horizontal period 1H in which an image sensor drives a single pixel and to obtain a pixel signal. As an example, the horizontal period 1H may be a time period in which a controller of the image sensor may drive a selected driving line among a plurality of driving lines and may obtain pixel signals from column lines intersecting the selected driving line. In the description below, an exemplary embodiment of the present inventive concept will be described with reference to FIG. 5 for ease of description.

Referring to FIG. 8, image (a) is a timing diagram illustrating an operation of an image sensor in a first frame period FT1, and image (b) is a timing diagram illustrating an operation of the image sensor in a second frame period FT2. Referring to image (a), a reset transistor RX may be turned on by a reset control signal RG and a voltage of a floating diffusion FD may be reset. In addition, along with the reset transistor RX, a switch device SW may also be turned on by a switch control signal SG and the voltage of the floating diffusion FD may be reset.

When the voltage of the floating diffusion FD is reset, the reset transistor RX and the switch device SW may be turned off, and a correlated double sampler CDS of a readout circuit may read out a first sub-reset voltage $V_{SRT1}$ from a pixel. When the first sub-reset voltage $V_{SRT1}$ is read out, a transfer transistor TX may be turned on by a transfer control signal TG and an electric charge of a photodiode PD may move to the floating diffusion FD.

As an example, while the first sub-reset voltage $V_{SRT1}$ is read out and the transfer transistor TX is turned on such that an electric charge of the photodiode PD moves to the floating diffusion FD, the switch device SW may maintain a turned off state. Accordingly, a capacitance of the floating diffusion FD may be a first capacitance $C_{FD1}$, and a conversion gain of a pixel may be a first value corresponding to the first capacitance $C_{FD1}$. In other words, the image sensor may move the electric charge of the photodiode PD to the floating diffusion FD and may read out the first sub-reset voltage $V_{SRT1}$ while the conversion gain has a first value. The correlated double sampler CDS may read out the first sub-reset voltage $V_{SRT1}$ and a first sub-pixel voltage $V_{SPX1}$ during a first sub-time period TS1, and a controller of the image sensor may obtain a first sub-pixel signal corresponding to a difference between the first sub-reset voltage $V_{SRT1}$ and the first sub-pixel voltage $V_{SPX1}$.

When the first sub-time period TS1 elapses and a second sub-time period TS2 starts, the image sensor may turn on the switch device SW. In exemplary embodiments of the present inventive concept, a turn-on timing of the switch device SW may be varied. When the switch device SW is turned on, the capacitance of the floating diffusion FD may be a sum of the first capacitance $C_{FD1}$ and a second capacitance $C_{FD2}$, and accordingly, a conversion gain of a pixel may have a second value corresponding to the sum of the first capacitance $C_{FD1}$ and the second capacitance $C_{FD2}$. The second value may be smaller than the first value.

While the conversion gain of the pixel has the second value, the correlated double sampler CDS may obtain a second sub-pixel voltage $V_{SPX2}$ and a second sub-reset voltage $V_{SRT2}$. After the second sub-pixel voltage $V_{SPX2}$ is read out, the reset transistor RX may be turned on and the electric charge of the floating diffusion FD may be removed, and while the reset transistor RX is turned off, the second sub-reset voltage $V_{SRT2}$ may be read out. A controller of the image sensor may obtain a second sub-pixel signal corresponding to a difference between the second sub-pixel voltage $V_{SPX2}$ and the second sub-reset voltage $V_{SRT2}$ during the second sub-time period TS2. The image sensor may generate a first image frame using the first sub-pixel signal and the second sub-pixel signal obtained in the first frame period FT1.

Referring to image (b) FIG. 8, the image sensor may control the switch devices SW of pixels to maintain a turned-on state during a second frame period, and may obtain a second reset voltage $V_{RT2}$ and a second pixel voltage $V_{PX2}$ from the pixels. The image sensor may generate a second image frame using a second pixel signal corresponding to a difference between the second reset voltage $V_{RT2}$ and the second pixel voltage $V_{PX2}$. In addition, the image sensor may generate a result image using the first image frame and the second image frame. In both images (a) and (b) of FIG. 8, the selection control signal SEL may be active during most of the horizontal period 1H, for example.

Referring to FIG. 9, image (a) is a timing diagram illustrating an operation of an image sensor in a first frame period FT1, and image (b) is a timing diagram illustrating an operation of an image sensor in a second frame period FT2. Referring to images (a) and (b) of FIG. 9, while a correlated double sampler CDS reads out a first reset voltage $V_{RT1}$ and a first pixel voltage $V_{PX1}$ in the first frame period FT1, a switch device SW may be turned off (e.g., SG low), and while the correlated double sampler CDS reads out a second reset voltage $V_{RT2}$ and a second pixel voltage $V_{PX2}$ in a second frame period FT2, the switch device SW may be turned on (e.g., SG high). Thus, a conversion gain of each of pixels may have a relatively large first value during the first frame period FT1, and may have a relatively small second value during the second frame period FT2. The image sensor may generate a result image using a first image frame generated in the first frame period FT1 and a second image frame generated in the second frame period FT2.

The image sensor may expose photodiodes of pixels to light during a first exposure time ET1 in the first frame period FT1, and may expose photodiodes of pixels to light during a second exposure time ET2 shorter than the first exposure time ET1 in the second frame period FT2. In this case, the image sensor in accordance with an exemplary embodiment of the present inventive concept may increase a conversion gain of pixels when an exposure time is relatively long, and may decrease a conversion gain of pixels when an exposure time is relatively short. As described above, by dynamically adjusting a conversion gain of pixels in accordance with the exposure time, noise properties and a dynamic range may improve, thereby increasing the quality of an image.

Figure 10:
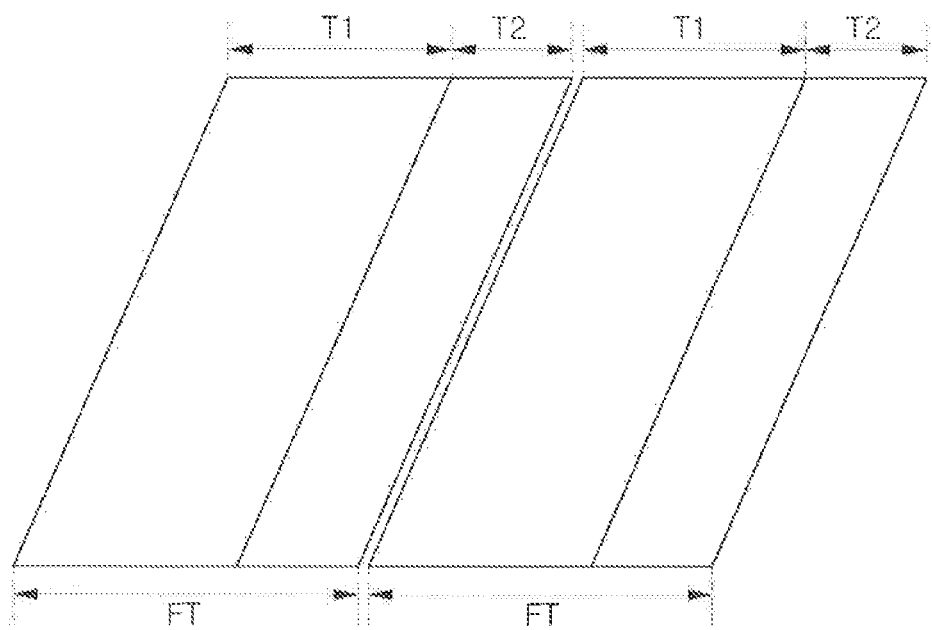
FIG. 10 is a diagram illustrating an operation of an image sensor according to an exemplary embodiment of the present inventive concept.
Figure 11:
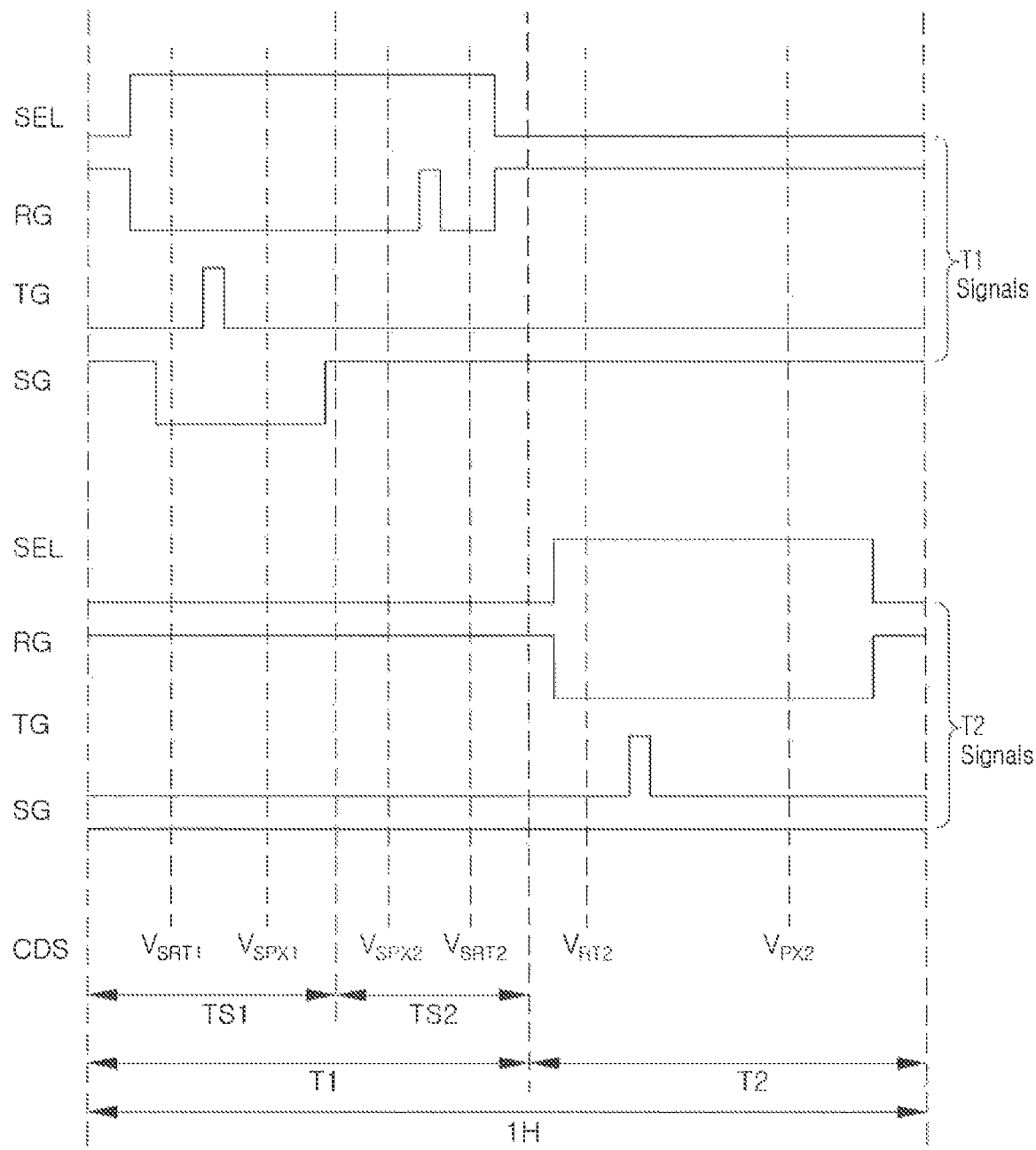
FIGS. 11 and 12 are diagrams illustrating an operation of an image sensor according to exemplary embodiments of the present inventive concept.
Figure 12:
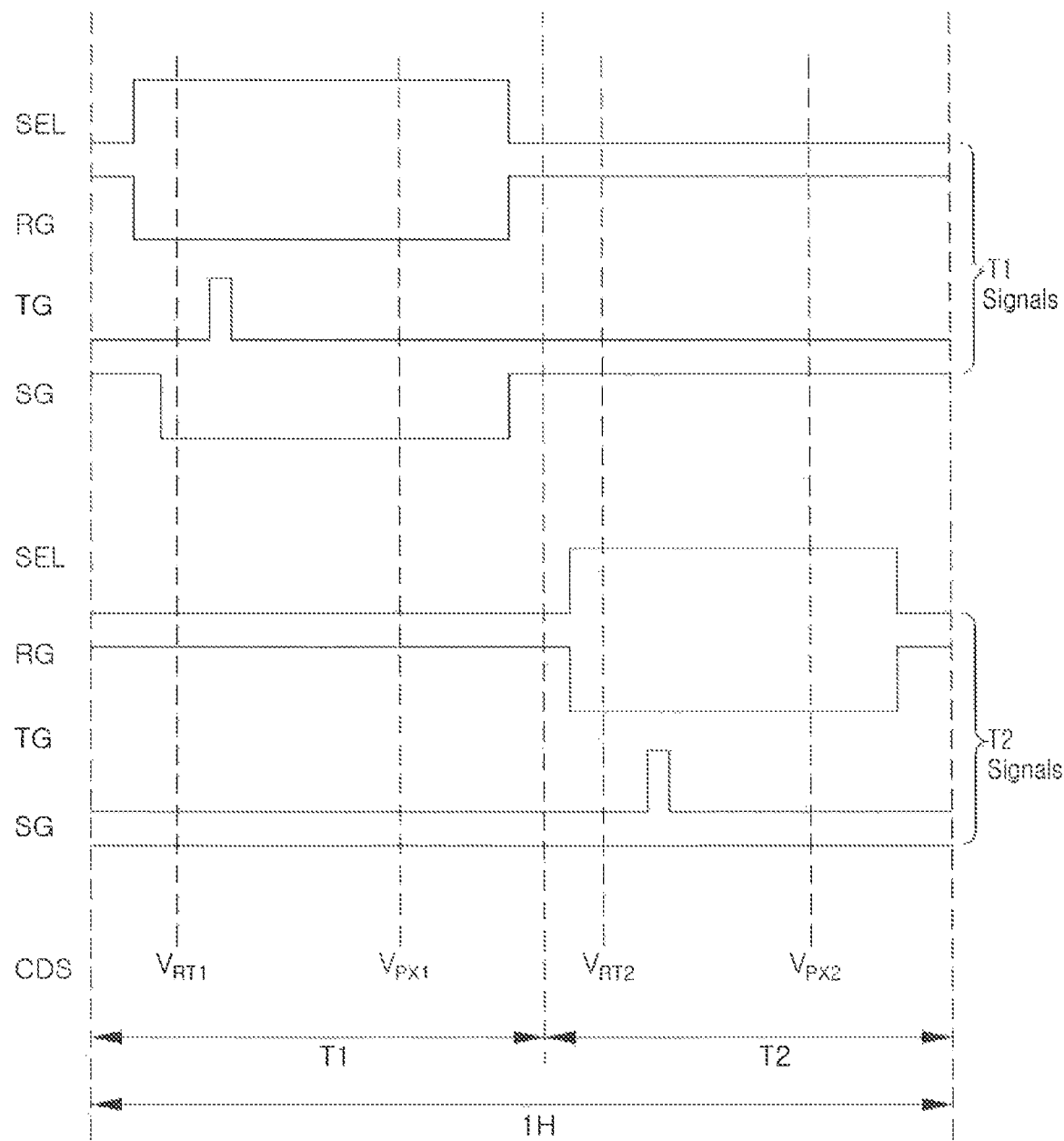

FIG. 10 is a diagram illustrating an operation of an image sensor according to an exemplary embodiment of the present inventive concept. FIGS. 11 and 12 are diagrams illustrating an operation of an image sensor according to exemplary embodiments of the present inventive concept.

An image sensor in the present embodiment may obtain a plurality of pixel signals from each of a plurality of pixels in a single frame period FT, and may generate a single result image using the plurality of pixel signals. Referring to FIG. 10, the image sensor may divide the single frame period FT into a first time period T1 and a second time period T2, may drive a plurality of row lines in each of the first time period T1 and the second time period T2, and may obtain pixel signals through a plurality of column lines.

In the embodiment illustrated in FIG. 10, the image sensor may obtain a first pixel signal corresponding to the first time period T1 and a second pixel signal corresponding to the second time period T2. The image sensor may generate a result image using the first pixel signal and the second pixel signal. The image sensor may expose a photodiode of a pixel to light in the first time period T1 and the second time period T2 for different exposure times. In an exemplary embodiment of the present inventive concept, a time for which a photodiode is exposed to light in the first time period T1 may be longer than a time for which a photodiode is exposed to light in the second time period T2.

The image sensor may adjust a conversion gain of each of pixels to have different values in the first time period T1 and the second time period T2. As an example, the image sensor may adjust a conversion gain of each of pixels by changing a capacitance of a floating diffusion included in the pixels. In an exemplary embodiment of the present inventive concept, the image sensor may adjust the capacitance of the floating diffusion to be a first value during the first time period T1, and may adjust the capacitance of the floating diffusion to be a second value greater than the first value during the second time period T2, thereby changing the conversion gain of the pixels.

The timing diagrams illustrated in FIGS. 11 and 12 may illustrate an operation during a horizontal period 1H in which the image sensor drives a single pixel and to obtain a pixel signal. In the description below, an exemplary embodiment of the present inventive concept will be described with reference to the pixel circuit illustrated in FIG. 5 for ease of description.

In the embodiments illustrated in FIGS. 11 and 12, a horizontal period 1H may include a first time period T1 and a second time period T2. In addition, referring to FIG. 11, the first time period T1 may include a first sub-time period TS1 and a second sub-time period TS2. During the first sub-time period TS1, a reset transistor RX may be turned on by a reset control signal RG and a switch device SW may be turned on by a switch control signal SG such that a voltage of a floating diffusion FD may be reset.

When the voltage of the floating diffusion FD is reset, a correlated double sampler CDS may read out a first sub-reset voltage $V_{SRT1}$ from a pixel. When the first sub-reset voltage $V_{SRT1}$ is read out, a transfer transistor TX may be turned on by a transfer control signal TG such that an electric charge of a photodiode PD may move to the floating diffusion PD. As an example, while the correlated double sampler CDS reads out the first sub-reset voltage $V_{SRT1}$, the transfer transistor TX is turned on, the electric charge of the photodiode PD moves to the floating diffusion FD, and the switch device SW may maintain a turn-off state. Accordingly, a capacitance of the floating diffusion FD may be a first capacitance $C_{FD1}$, and a conversion gain of a pixel may be a first value corresponding to the first capacitance $C_{FD1}$. A controller of the image sensor may move the electric charge of the photodiode PD to the floating diffusion FD and may read out a first sub-pixel voltage $V_{SPX1}$ while the conversion gain of the pixel has the first value. A controller of the image sensor may obtain a first sub-pixel signal corresponding to a difference between the first sub-reset voltage $V_{SRT1}$ and the first sub-pixel voltage $V_{SPX1}$.

When a first sub-time period TS1 elapses and a sub-time period TS2 starts, an image sensor may turn on the switch device SW. In exemplary embodiments of the present inventive concept, a turn-on timing of the switch device SW may be moved forward or moved backward. When the swath device SW is turned on, the capacitance of the floating diffusion FD may be a sum of a first capacitance $C_{FD1}$ and a second capacitance $C_{FD2}$, and the conversion gain of the pixel may thus have a second value corresponding to the sum of the first capacitance $C_{FD1}$ and the second capacitance $C_{FD2}$. The second value may be smaller than the first value.

While the conversion gain of the pixel has the second value, the correlated double sampler CDS may obtain a second sub-pixel voltage $V_{SPX2}$ and a second sub-reset voltage $V_{SRT2}$ in order. After the second sub-pixel voltage $V_{SPX2}$ is read out, the reset transistor RX may be turned on, and the electric charge of the floating diffusion FD may be removed, and while the reset transistor RX is turned off, the second sub-reset voltage $V_{SRT2}$ may be read out. The image sensor may obtain a second sub-pixel signal corresponding to a difference between the second sub-reset voltage $V_{SRT2}$ and the second sub-pixel voltage $V_{SPX2}$ during the sub-time period TS2.

The switch device SW may maintain a turned-on state in the second time period T2 after the first time period T1, and the correlated double sampler CDS may read out a second reset voltage $V_{RT2}$ and a second pixel voltage $V_{PX2}$ from a pixel. A controller of the image sensor may calculate a difference between the second reset voltage $V_{RT2}$ and the second pixel voltage $V_{PX2}$ and may obtain a second pixel signal. The controller of the image sensor may determine a pixel signal corresponding to each of pixels using a first sub-pixel signal, a second sub-pixel signal, and a second pixel signal obtained from each of pixels, and may generate a result image using these pixel signals. In an exemplary embodiment of the present inventive concept, a pixel outputting the first sub-pixel signal and the second sub pixel signal through a single column line during the first time period T1 of a single horizontal period 1H may be connected to row lines different from row lines connected to a pixel outputting a second pixel signal through a single column line during the sub-time period TS2.

Referring to FIG. 12, while a correlated double sampler CDS reads out a first reset voltage $V_{RT1}$ and a first pixel voltage $V_{PX1}$ in a first time period T1, a switch device SW may be turned off (e.g., SG low), and while the correlated double sampler CDS reads out a second reset voltage $V_{RT2}$ and a second pixel voltage $V_{PX2}$ in the second time period T2, the switch device SW may be turned on (e.g., SG high). Accordingly, a conversion gain of pixels may have a relatively large first value during the first time period T1, and may have a relatively small second value during the second time period T2. A controller of an image sensor may determine a pixel signal corresponding to each of pixels using a first sub-pixel signal, a second sub-pixel signal, and a second pixel signal obtained from each of pixels, and may generate a result image using the pixel signals. Like the embodiment illustrated in FIG. 11, a pixel outputting the first sub-pixel signal and the second sub-pixel signal through a single column line during the first time period T1 of a single horizontal period 1H may be connected to row lines different from row lines connected to a pixel outputting the second pixel signal through a single column line during the second time period T2.

A time for which a photodiode of each of pixels is exposed to light in the first time period T1 may be longer than a time for which a photodiode of each of pixels is exposed to light in the second time period T2. The controller of an image sensor in an exemplary embodiment of the present inventive concept may increase conversion gains of pixels when the exposure time is relatively long, and the controller may decrease conversion gains of pixels when the exposure time is relatively short. By dynamically adjusting conversion gains of pixels in accordance with the exposure time as described above, noise properties and a dynamic range may improve, thereby increasing the quality of an image.

Figure 13:
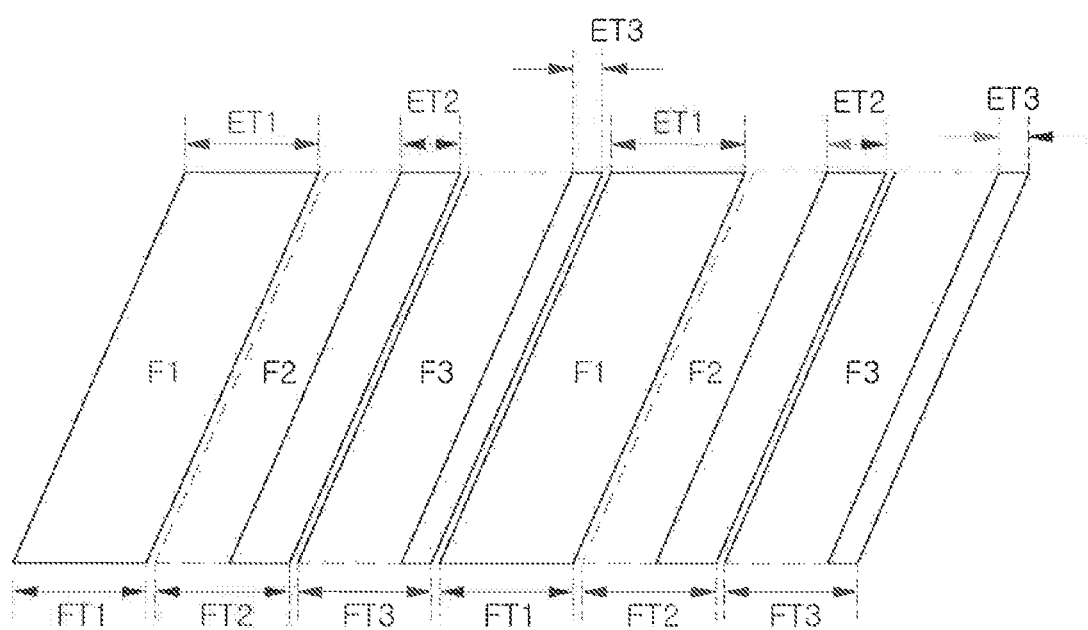
FIG. 13 is a diagram illustrating an operation of an image sensor according to an exemplary embodiment of the present inventive concept.
Figure 14:
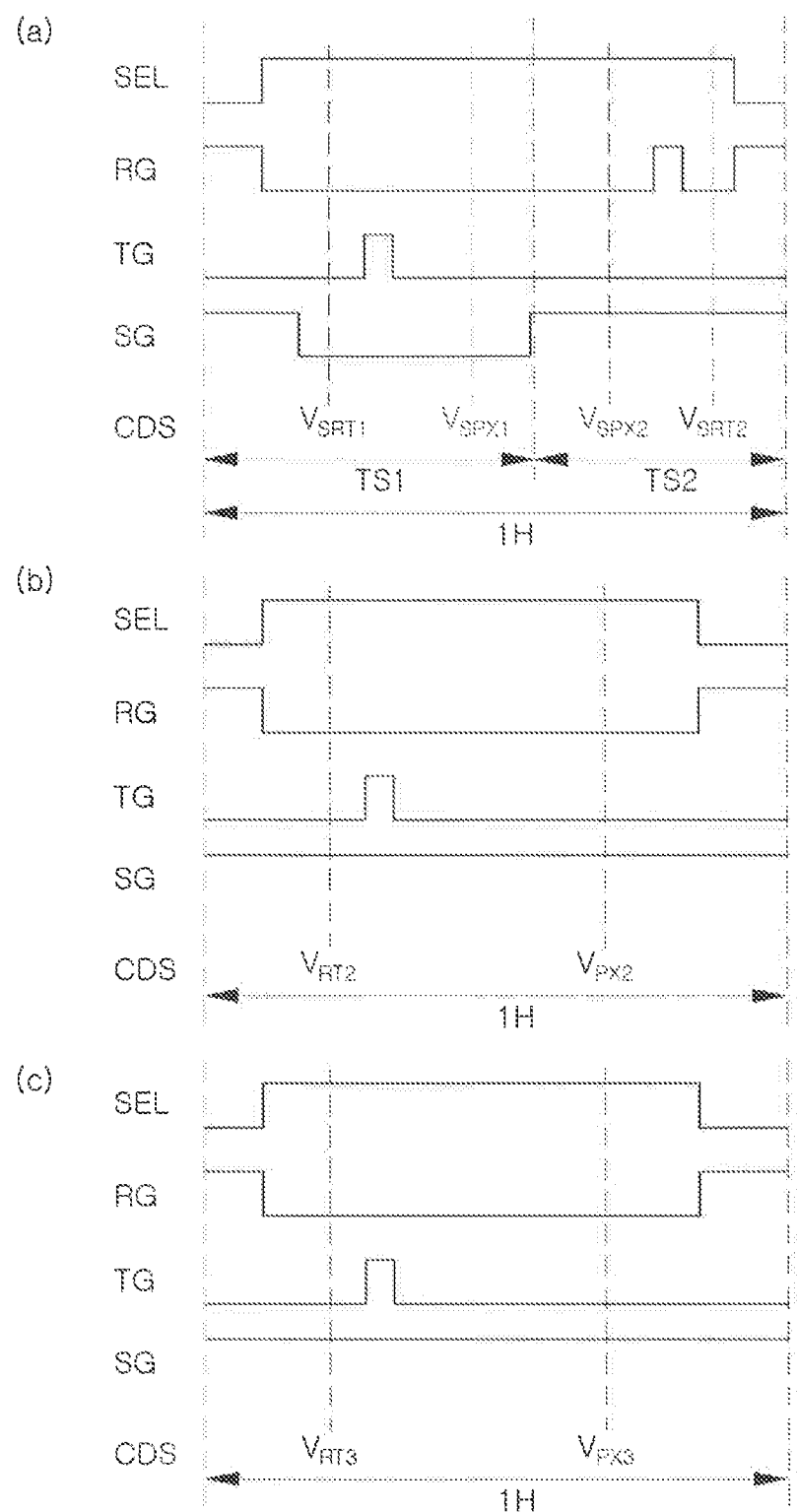
FIGS. 14 and 15 are diagrams illustrating an operation of an image sensor according to exemplary embodiments of the present inventive concept.
Figure 15:
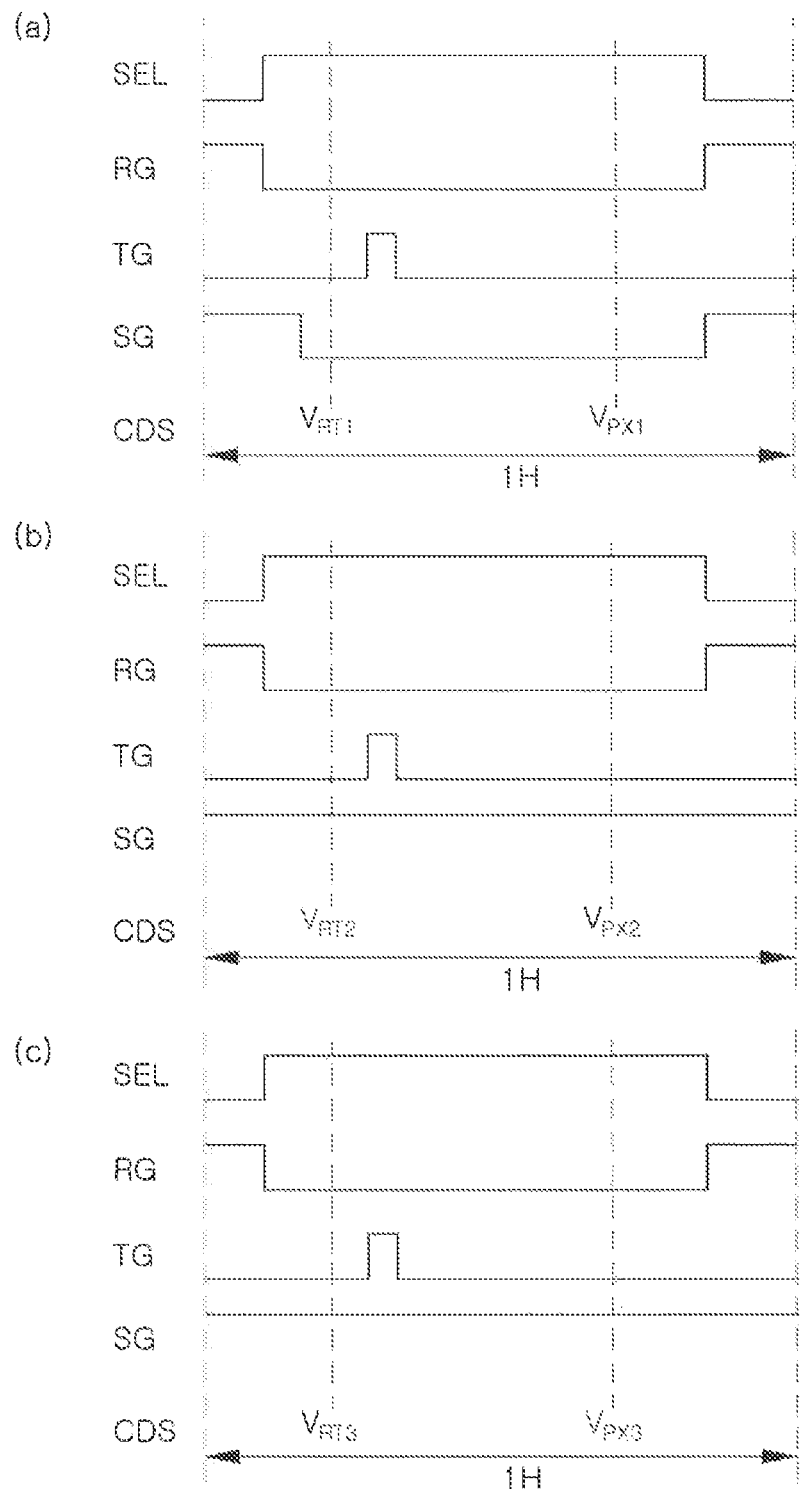

FIG. 13 is a diagram illustrating an operation of an image sensor according to an exemplary embodiment of the present inventive concept. FIGS. 14 and 15 are diagrams illustrating an operation of an image sensor according to an exemplary embodiment of the present inventive concept.

In the embodiment illustrated in FIG. 13, an image sensor may generate a single result image using first, second and third image frames F1, F2 and F3 obtained during first, second and third frame periods FT1, FT2 and FT3. In the first to third frame periods FT1 to FT3, pixels may be exposed to light for different periods of exposure time ET1 to ET3. As an example, a first exposure time ET1 of the first frame period FT1 may be the longest, and a third exposure time ET3 of the third frame period FT3 may be the shortest. A second exposure time ET2 of the second frame period FT2 may be shorter than the first exposure time ET1 and may be longer than the third exposure time ET3.

Referring to FIGS. 14 and 15, an operation of an image sensor will be described. Referring to FIG. 14, image (a) is a timing diagram illustrating an operation of an image sensor in a first frame period FT1, image (b) is a timing diagram illustrating an operation of an image sensor in a second frame period FT2, and image (c) is a timing diagram illustrating an operation of an image sensor in a third frame period FT3.

Referring to image (a) in FIG. 14, a controller of an image sensor may reset a voltage of a floating diffusion FD by turning on a reset transistor RX and a switch device SW. When the reset transistor RX is turned off, a correlated double sampler CDS may read out a first sub-reset voltage $V_{SRT1}$ from a pixel. When a transfer transistor TX is turned on and an electric charge of a photodiode PD moves to the floating diffusion FD, the correlated double sampler CDS may read out the first sub-pixel voltage $V_{SPX1}$. While the correlated double sampler CDS obtains the first sub-reset voltage $V_{SRT1}$ and the first sub-pixel voltage $V_{SPX1}$ in a first sub-time period TS1, a switch device SW may be turned off (e.g., SG low), and the floating diffusion FD may have a first capacitance $C_{FD1}$.

The correlated double sampler CDS may obtain a second sub-pixel voltage $V_{SPX2}$ and a second sub-reset voltage $V_{SRT2}$ in order during the second sub-time period TS2 subsequent to the first sub-time period TS1. The switch device SW may be turned on (e.g., SG high) during the second sub-time period TS2, and a second capacitance $C_{FD2}$ may be added to the capacitance of the floating diffusion FD. Accordingly, a conversion gain of a pixel may decrease. A controller of the image sensor may generate a first image frame F1 corresponding to the first frame period FT1 using a first sub-pixel signal corresponding to a difference between the first sub-reset voltage $V_{SRT1}$ and the first sub-pixel voltage $V_{SPX1}$, and a second sub-pixel signal corresponding to a difference between the second sub-reset voltage $V_{SRT2}$ and the second sub-pixel voltage $V_{SPX2}$.

Referring to images (b) and (c) in FIG. 14, an operation of an image sensor in the second frame period FT2 may be similar to an operation of the image sensor in the third frame period FT3. When the reset transistor RX and the switch device SW are turned on and a voltage of the floating diffusion FD is reset, the correlated double sampler CDS may read out a second reset voltage $V_{RT2}$ or a third reset voltage $V_{RT3}$. In addition, when the transfer transistor TX is turned on and an electric charge of a photodiode PD moves to the floating diffusion FD, the correlated double sampler CDS may read out a second pixel voltage $V_{PX2}$ or a third pixel voltage $V_{PX3}$. The image sensor may generate a second image frame F2 using a second pixel signal corresponding to a difference between the second reset voltage $V_{RT2}$ and the second pixel voltage $V_{PX2}$, and may generate a third image frame F3 using a third pixel signal corresponding to a difference between the third reset voltage $V_{RT3}$ and the third pixel voltage $V_{PX3}$.

FIG. 15 includes timing diagrams illustrating operations of an image sensor in the first to third frame periods FT1 to FT3. Referring to images (b) and (c) in FIG. 15, operations of the image sensor in the second frame period FT2 and the third frame period FT3 may be similar to those described with reference to FIG. 14.

Referring to image (a) in FIG. 15, a correlated double sampler CDS may obtain a first reset voltage $V_{RT1}$ and a first pixel voltage $V_{PX1}$ during the first frame period FT1. While the correlated double sampler CDS obtains the first reset voltage $V_{RT1}$ and the first pixel voltage $V_{PX1}$, a switch device SW may be turned off (e.g., SG low), and a conversion gain of a pixel may have a relatively large value. The switch device SW may maintain a turned-on state (e.g., SG high) during the second frame period FT2 and the third frame period FT3 shown in images (b) and (c) of FIG. 15, and a conversion gain of a pixel may have a relatively small value.

Figure 16:
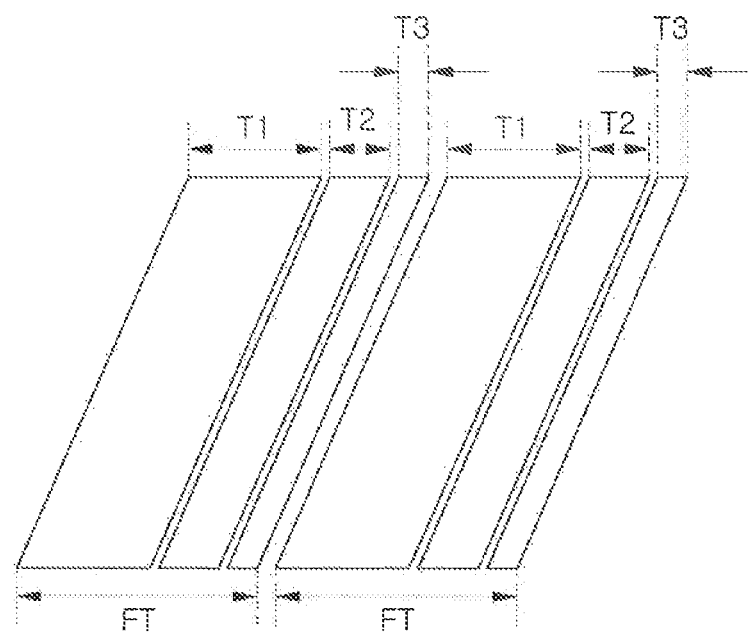
FIG. 16 is a diagram illustrating an operation of an image sensor according to an exemplary embodiment of the present inventive concept.
Figure 17:
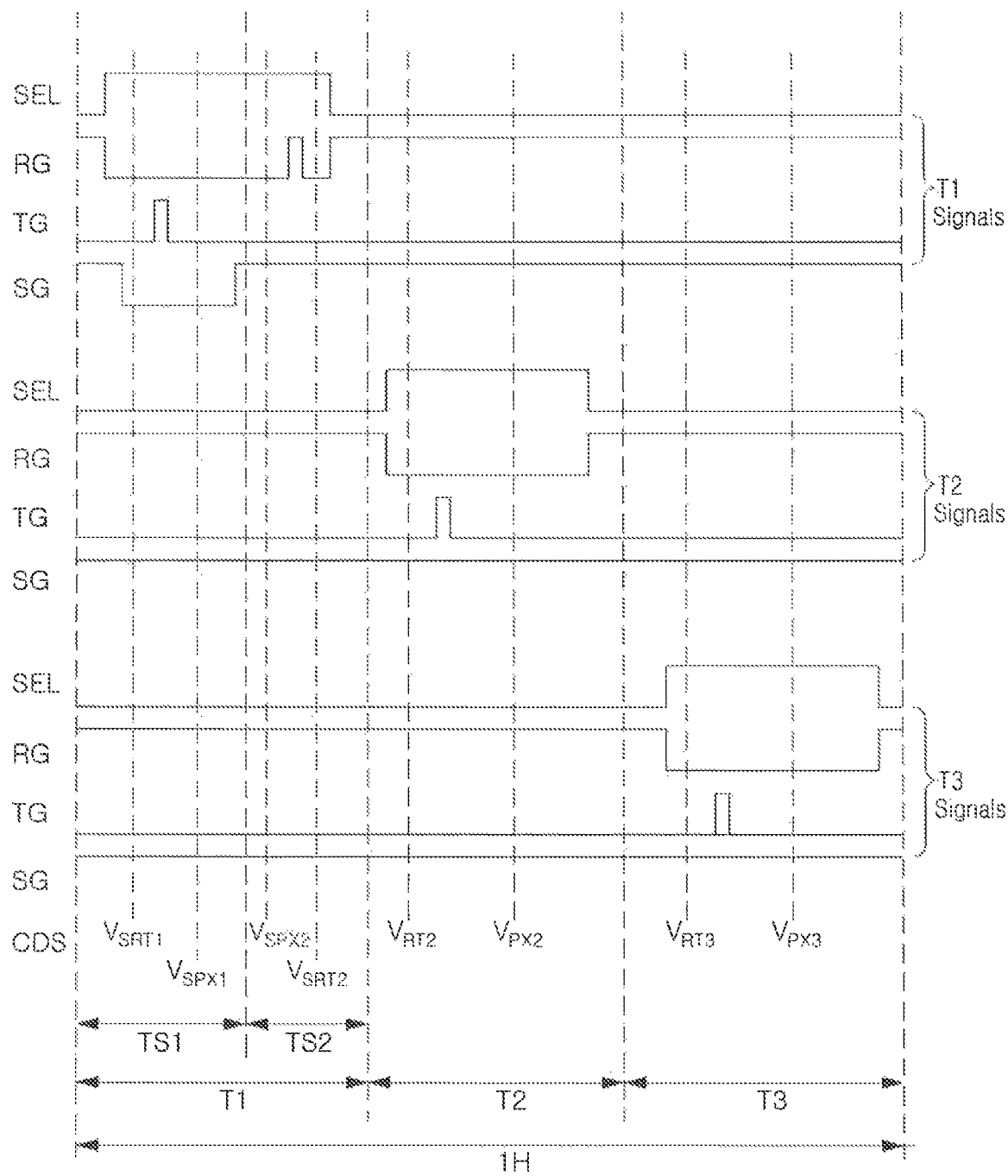
FIGS. 17 and 18 are diagrams illustrating an operation of an image sensor according to exemplary embodiments of the present inventive concept.
Figure 18:
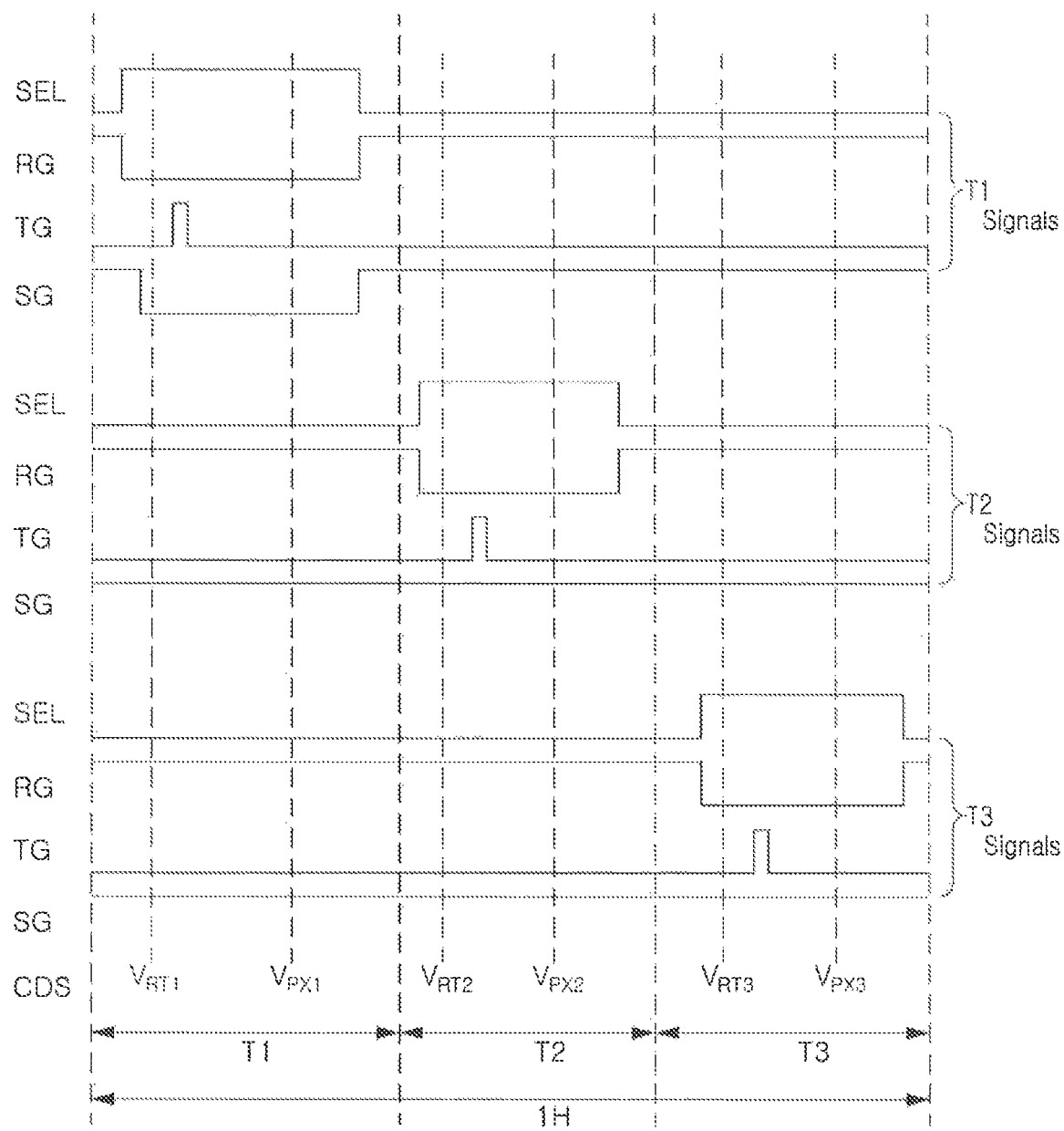

FIG. 16 is a diagram illustrating an operation of an image sensor according to an exemplary embodiment of the present inventive concept. FIGS. 17 and 18 are diagrams illustrating an operation of an image sensor according to an exemplary embodiment of the present inventive concept.

An image sensor in the embodiment illustrated in FIG. 16 may obtain a plurality of pixel signals from each of a plurality of pixels during a single frame period FT, and may generate a single result image using the plurality of pixel signals. Referring to FIG. 16, the image sensor may divide the single frame period FT into first, second and third time periods T1, T2 and T3, and may obtain pixel signals from each of the first to third time periods T1 to T3. The pixels may be exposed to light during different periods of exposure time in the first to third time periods T1 to T3. As an example, the first time period T1 may have the longest exposure time, and the third time period T3 may have the shortest exposure time.

The image sensor may adjust conversion gains of pixels to have different values in the first to third time periods T1 to T3. As an example, the image sensor may adjust a conversion gain of pixels by changing a capacitance of floating diffusions FD included in the pixels. In an exemplary embodiment of the present inventive concept, the image sensor may adjust the capacitance of the floating diffusion FD to be a first value during the first time period T1, and may adjust the capacitance of the floating diffusion FD to be a second value greater than the first value during the second time period T2 and the third time period T3.

The timing diagrams illustrated in FIGS. 17 and 18 may illustrate an operation during a horizontal period 1H in which the image sensor drives a single pixel and to obtain a pixel signal. In the description below, an exemplary embodiment of the present inventive concept will be described with reference to the pixel circuit illustrated in FIG. 5 for ease of description.

In the embodiments illustrated in FIGS. 17 and 18, a horizontal period 1H may include first to third time periods T1 to T3. In the embodiment illustrated in FIG. 17, the first time period T1 may include a first sub-time period TS1 and a second sub-time period TS2. A correlated double sampler CDS may obtain a first sub-pixel voltage $V_{SPX1}$ and a first sub-reset voltage $V_{SRT1}$ during the first sub-time period TS1, and may obtain a second sub-pixel voltage $V_{SPX2}$ and a second sub-reset voltage $V_{SRT2}$ during the second sub-time period TS2. In addition, the correlated double sampler CDS may obtain a second reset voltage $V_{RT2}$ and a second pixel voltage $V_{PX2}$ during the second time period T2, and may obtain a third reset voltage $V_{RT3}$ and a third pixel voltage $V_{PX3}$ during the third time period T3.

Referring to FIG. 17, a switch device SW may turned off only while the first sub-reset voltage $V_{SRT1}$ and the first sub-pixel voltage $V_{SPX1}$ are read out. For example, only during the first time period T1 is the switching control signal SG transitioned to a low level. Accordingly, a conversion gain of a pixel during the first sub-time period TS1 may be greater than a conversion gain of a pixel during the second sub-time period TS2, the second time period T2, and the third time period T3.

Referring to FIG. 18, a correlated double sampler CDS may turn off a switch device SW and may obtain a first reset voltage $V_{RT1}$ and a first pixel voltage $V_{PX1}$ during a first time period T1. In addition, the correlated double sampler CDS may obtain a second reset voltage $V_{RT2}$ and a second pixel voltage $V_{PX2}$ during a second time period T2, and may obtain a third reset voltage $V_{RT3}$ and a third pixel voltage $V_{PX3}$ during a third time period T3. The switch device SW may maintain a turned-on state during the second time period T2 and the third time period T3. For example, the switching control signal SG may be kept high during the second and third time periods T2 and T3. Accordingly, the first reset voltage $V_{RT1}$ and the first pixel voltage $V_{PX1}$ may be output while a conversion gain of a corresponding pixel has a relatively large value, and the second reset voltage $V_{RT2}$, the second pixel voltage $V_{PX2}$, the third reset voltage $V_{RT3}$, and the third pixel voltage $V_{PX3}$ may be output while corresponding pixels have relative small conversion gains.

In an exemplary embodiment of the present inventive concept, a controller of the image sensor may read out reset voltages and pixel voltages from different pixels connected to a single column line in each of the first to third time periods T1 to T3 included in a single horizontal period 1H, and may calculate a difference between a reset voltage and a pixel voltage to generate a pixel signal. In the embodiments in FIGS. 17 and 18, a controller of an image sensor may obtain at least three pixel signals from each of pixels. The controller of an image sensor may obtain three pixel signals output from a single pixel in the first time period T1, the second time period T2, and the third time period T3 included in each of three different horizontal periods 1H.

Figure 19A:
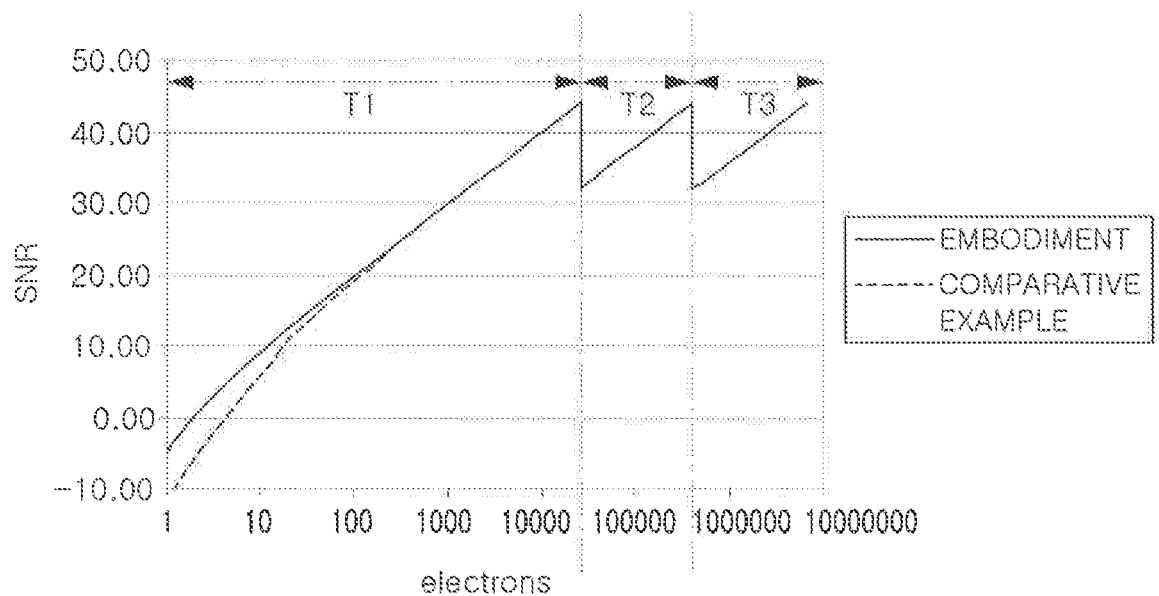
FIGS. 19A and 19B are graphs illustrating an operation of an image sensor according to exemplary embodiments of the present inventive concept.
Figure 19B:
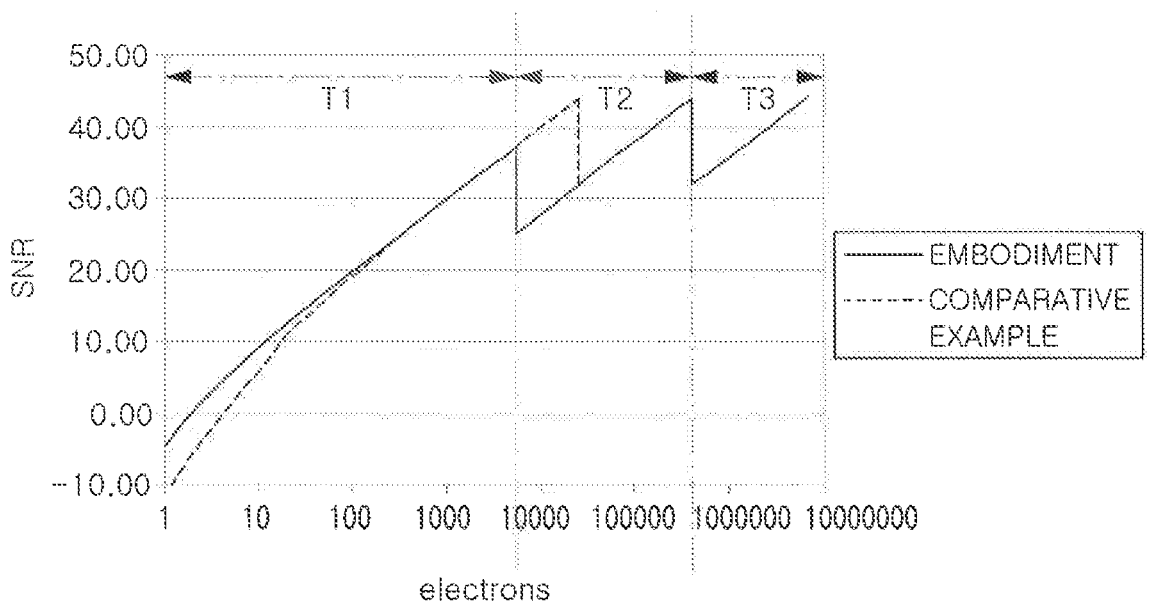

FIGS. 19A and 19B are graphs illustrating an operation of an image sensor according to an exemplary embodiment of the present inventive concept.

As an example, FIG. 19A may be a graph illustrating an image sensor operating in accordance with the embodiment described with reference to FIG. 17. FIG. 19B is a graph illustrating an image sensor operating in accordance with the embodiment described with reference to FIG. 18. In the graphs illustrated in FIGS. 19A and 19B, a comparative example may correspond to an image sensor in which pixels may not include a switch device connected between a reset transistor and a floating diffusion.

FIGS. 19A and 19B are graphs illustrating a signal to noise ratio (SNR) in accordance with the number of electrons generated in a photodiode and moving to a floating diffusion. In the example illustrated in FIG. 19A, the image sensor may obtain a first sub-pixel signal by turning off a switch device during a first sub-time period TS1, and may obtain a second sub-pixel signal by turning on a switch device during a second sub-time period TS2. When the switch device is turned off, a conversion gain of a pixel may increase, and accordingly, when the number of electrons is decreased, a signal to noise ratio may improve. Thus, noise properties and a dynamic range of the image sensor may improve.

When an exposure time of a pixel changes, a signal to noise ration in accordance with the number of electrons may change. In the embodiment illustrated in FIG. 19A, after a switch device SW is turned on in the second sub-time period TS2, a second time period T2 may start. Thus, a difference in the signal to noise ratio between the first time period T1 and the second time period T2 may be substantially the same as a difference in the signal to noise ration between the second time period T2 and the third time period T3.

In the embodiment illustrated in FIG. 19B, the image sensor may turn off the switch device SW during the first time period T1 and may obtain a first sub-pixel signal, and may turn on the switch device SW during the second time period T2 and the third time period T3 and may obtain a second sub-pixel signal. In the embodiment illustrated in FIG. 19B, as a conversion gain of a pixel may increase during the first time period T1, when the number of electrons are decreased, a signal to noise ratio may increase such that noise properties and a dynamic range may improve.

In the embodiment illustrated in FIG. 19B, a ratio of a maximum signal of the first time period T1 to noise may be smaller than a ratio of a maximum signal of the second time period T2 to noise. That is because, a pixel voltage may not be read out in a state in which a switch device of a pixel is turned on and a conversion gain of a pixel is decreased during the first time period T1.

Figure 20:
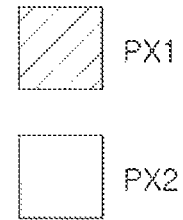
FIGS. 20 and 21 are diagrams illustrating an operation of an image sensor according to exemplary embodiments of the present inventive concept.
Figure 21:
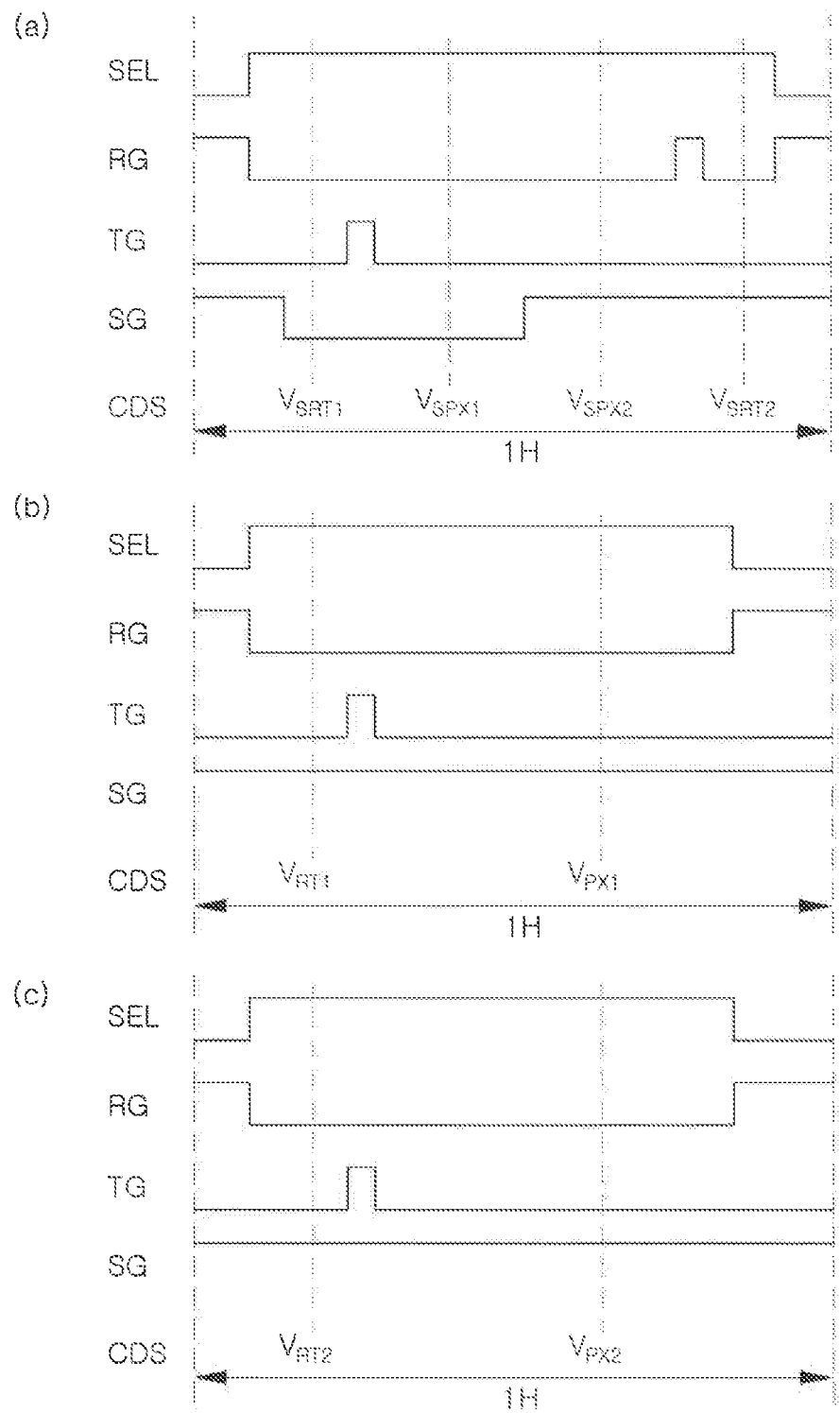

FIGS. 20 and 21 are diagrams illustrating an operation of an image sensor according to an exemplary embodiment of the present inventive concept.

Referring to FIG. 20, a pixel array PA of an image sensor may include a plurality of pixels, and four adjacent pixels may form a single pixel group PG. As an example, a single pixel group PG may include a red pixel R, a blue pixel B, and two green pixels GR and GB. Each of the pixels may have a pixel circuit described with reference to FIG. 5.

While a pixel signal is obtained from each of pixels, the pixels may be divided into a first pixel PX1 and a second pixel PX2. As an example, a switch device may be turned off in the first pixel PX1, and the switch device may be turned on in the second pixel PX2. Accordingly, a conversion gain of the first pixel PX1 may be greater than a conversion gain of the second pixel PX2.

FIG. 21 may be graphs illustrating an operation of an image sensor having the pixel array PA described with reference to FIG. 20. Images (a) and (b) in FIG. 21 may be graphs illustrating an operation of a first pixel PX1, and image (c) in FIG. 21 may be a graph illustrating an operation of a second pixel PX2.

Referring to image (a) in FIG. 21, a correlated double sampler CDS may read out a first sub-reset voltage $V_{SRT1}$, a first sub-pixel voltage $V_{SPX1}$, a second sub-pixel voltage $V_{SPX2}$, and a second sub-reset voltage $V_{SRT2}$ from the first pixel PX1 in order. A switch device SW included in the first pixel PX1 may be turned off (e.g., SG low) while the first sub-reset voltage $V_{SRT1}$ and the first sub-pixel voltage $V_{SPX1}$ are read out, the switch device SW may be turned on (e.g., SG high) while the second sub-pixel voltage $V_{SPX2}$ and the second sub-reset voltage $V_{SRT2}$ are read out.

Referring to image (b) in FIG. 21, the correlated double sampler CDS may read out a first reset voltage $V_{RT1}$ and a first pixel voltage $V_{PX1}$ from the first pixel PX1. While the correlated double sampler CDS reads out the first reset voltage $V_{RT1}$ and the first pixel voltage $V_{PX1}$, the switch device SW of the first pixel PX1 may be kept on, and a capacitance of a floating diffusion FD of the first pixel PX1 may decrease and a conversion gain may increase. Referring to image (c) of FIG. 21, while the correlated double sampler CDS reads out a second reset voltage $V_{RT2}$ and a second pixel voltage $V_{PX2}$, the switch device SW of the second pixel PX2 may maintain an turned-on state. Accordingly, a conversion gain of the second pixel PX2 may be smaller than a conversion gain of the first pixel PX1.

Figure 22:
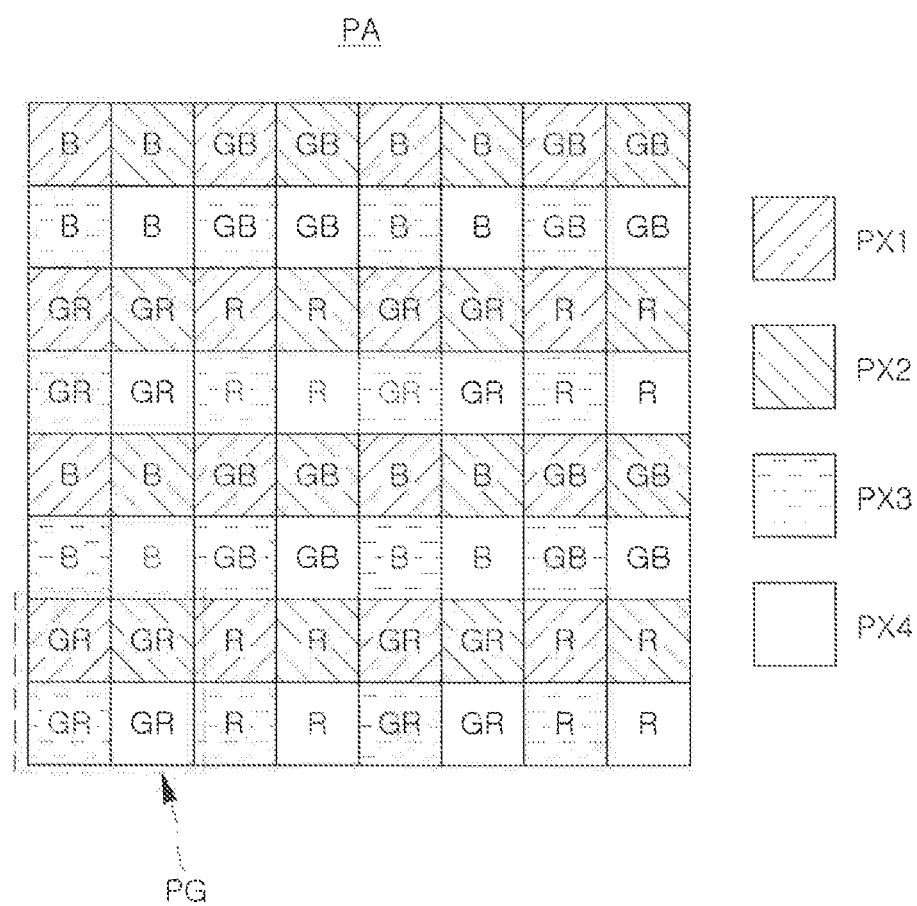
FIG. 22 is a diagram illustrating a pixel array of an image sensor according to an exemplary embodiment of the present inventive concept.
Figure 23:
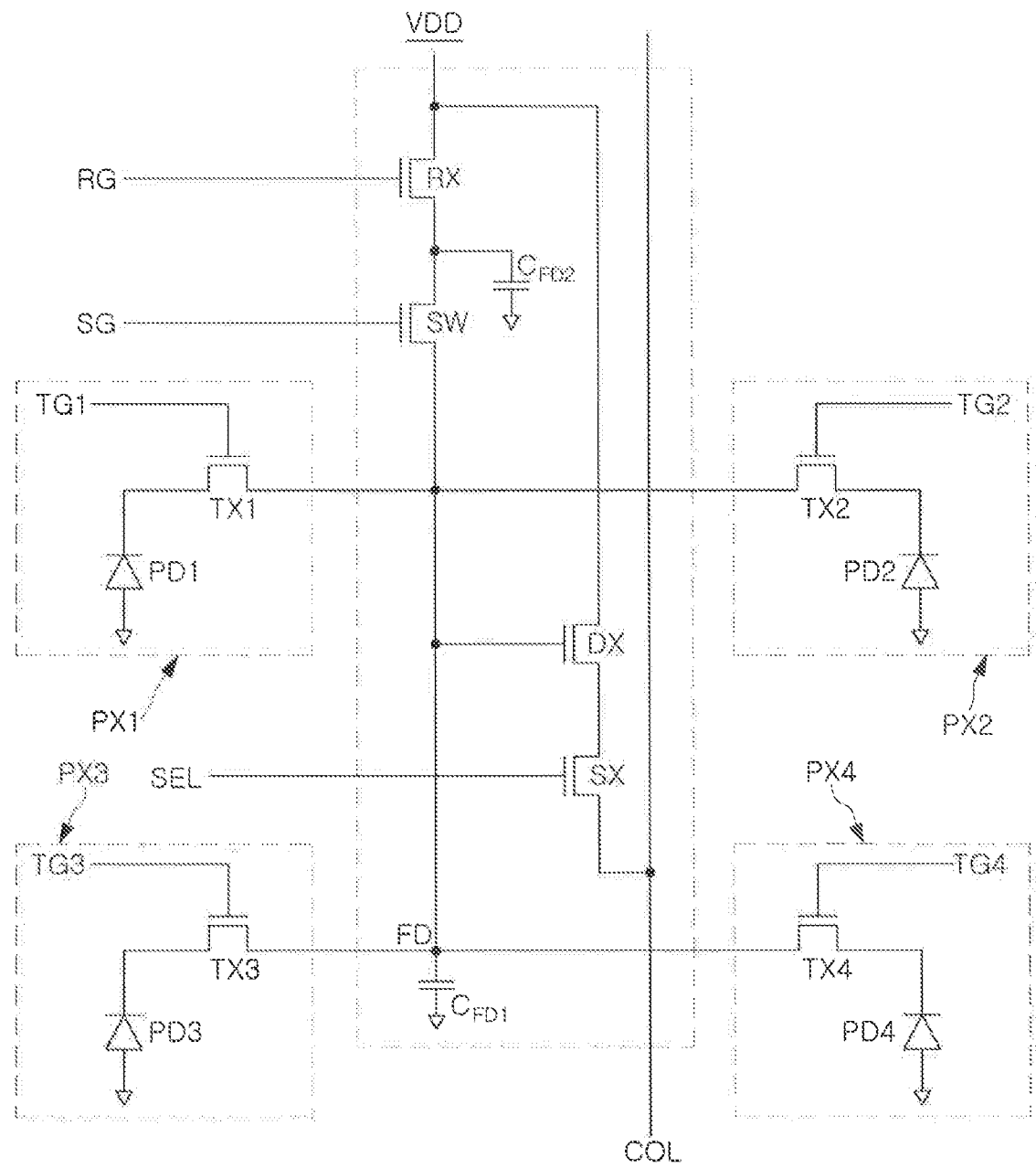
FIG. 23 is a circuit diagram illustrating a pixel circuit of an image sensor according to an exemplary embodiment of the present inventive concept.

FIG. 22 is a diagram illustrating a pixel array of an image sensor according to an exemplary embodiment of the present inventive concept. FIG. 23 is a circuit diagram illustrating a pixel circuit of an image sensor illustrated in FIG. 22 according to an exemplary embodiment of the present inventive concept.

Referring to FIG. 22, a pixel array PA of an image sensor may include a plurality of pixels, and adjacent first, second, third and fourth pixels PX1, PX2, PX3 and PX4 may form a single pixel group PG. As an example, photodiodes included in the first to fourth pixels PX1 to PX4 in a single pixel group PG may react to the same color of light and may generate an electric charge. In addition, the photodiodes included in a single pixel group PG may share a single column line.

Referring to FIG. 23, the first to fourth pixels PX1 to PX4 may include first, second, third and fourth photodiodes PD1, PD2, PD3 and PD4 and first, second, third and fourth transfer transistors TX1, TX2, TX3 and TX4. In addition, the first to fourth pixels PX1 to PX4 may share a floating diffusion FD, a reset transistor RX, a driving transistor DX, a selection transistor SX, and a switch device SW. As an example, when one of the first to fourth transfer transistors TX1 to TX4 is turned on, the others may be turned off. The image sensor may turn on the first to fourth transfer transistors TX1 to TX4 in order and may obtain pixel signals corresponding to each of the first to fourth photodiodes PD1 to PD4. First, second, third and fourth transfer control signals TG1, TG2, TG3 and TG4 may be applied to the gates of the first to fourth transfer transistors TX1 to TX4.

The image sensor may apply different exposure times to the first to fourth pixels PX1 to PX4. As an example, a first exposure time, the longest, may be applied to the first pixel PX1, and a fourth exposure time, the shortest, may be applied to the fourth pixel PX4. A second exposure time of the second pixel PX2 and a third exposure time of the third pixel PX3 may be shorter than the first exposure time and may be longer than the fourth exposure time. The image sensor may decrease a capacitance of the floating diffusion FD by turning off the switch device SW while reading out a reset voltage and a pixel voltage from the first pixel PX1 to which the longest first exposure time is applied. In addition, in exemplary embodiments of the present inventive concept, the switch device SW may be turned off while a reset voltage and a pixel voltage are read out from the second pixel PX2, or from the second pixel PX2 and the third pixel PX3.

The image sensor may generate a group pixel signal corresponding to a single pixel group PG using the pixel signals obtained from the first to fourth pixels PX1 to PX4, and may generate a result image using the group pixel signal. Accordingly, a dynamic range of the result image may improve. In the description below, operations of the image sensor illustrated in the embodiments in FIGS. 22 and 23 will be described in greater detail with reference to FIGS. 24 and 25.

Figure 24:
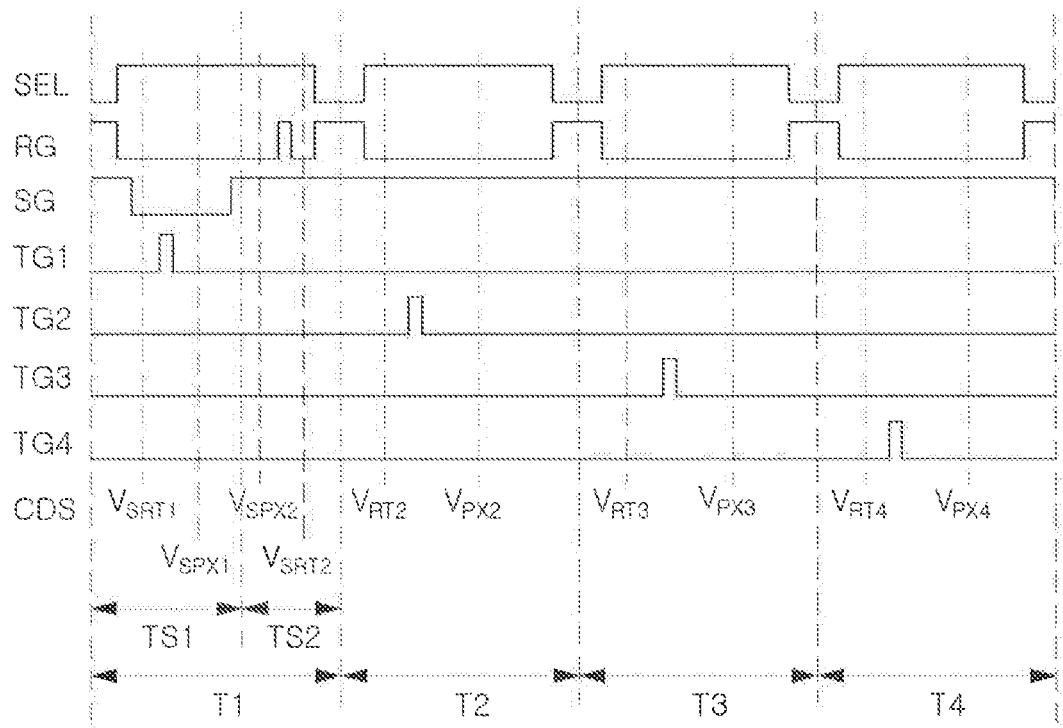
FIGS. 24 and 25 are diagrams illustrating an operation of an image sensor according to exemplary embodiments of the present inventive concept.
Figure 25:
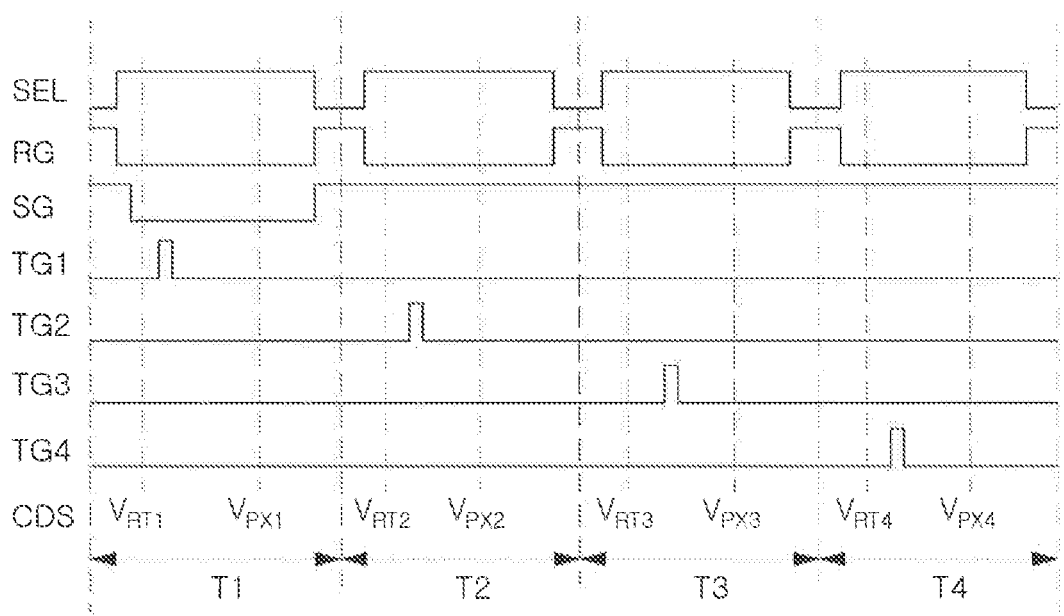

FIGS. 24 and 25 are diagrams illustrating an operation of an image sensor according to an exemplary embodiment of the present inventive concept.

Referring to FIGS. 24 and 25, a correlated double sampler CDS may read out a reset voltage and a pixel voltage from each of first to fourth pixels PX1 to PX4 included in a single pixel group PG. The correlated double sampler CDS may perform a readout operation with respect to the first to fourth pixels PX1 to PX4 throughout first to fourth time periods T1 to T4.

Referring to FIG. 24, the correlated double sampler CDS may read out a first sub-reset voltage $V_{SRT1}$, a first sub-pixel voltage $V_{SPX1}$, a second sub-pixel voltage $V_{SPX2}$, and a second sub-reset voltage $V_{SRT2}$ from a first pixel PX1 during the first time period T1. While the correlated double sampler CDS reads out the first sub-reset voltage $V_{SRT1}$ and the first sub-pixel voltage $V_{SPX1}$, the switch device SW may be turned off. In addition, while the correlated double sampler CDS reads out the second sub-pixel voltage $V_{SPX2}$ and the second sub-reset voltage $V_{SRT2}$, the switch device SW may be turned on. Accordingly, a capacitance of a floating diffusion FD may be limited to a first capacitance $C_{FD1}$ during a portion of the first time period T1.

The switch device SW may maintain a tamed-on state during the second to fourth time periods T2 to T4. Accordingly, while a readout operation related to the second to fourth time periods T2 to T4 is performed, the capacitance of the floating diffusion FD may be a sum of the first capacitance $C_{FD1}$ and a second capacitance $C_{FD2}$. Thus, a conversion gain of the pixel group PG may decrease during the second to fourth time periods T2 to T4.

Referring to FIG. 25, a correlated double sampler CDS may read out a first reset voltage $V_{RT1}$ and a first pixel voltage $V_{PX1}$ from the first pixel PX1 during the first time period T1. While the correlated double sampler CDS reads out the first reset voltage $V_{RT1}$ and the first pixel voltage $V_{PX1}$, the switch device SW may be turned off. Accordingly, a capacitance of the floating diffusion FD in the first time period T1 may be limited to a first capacitance $C_{FD1}$, and a conversion gain of the pixel group PG may increase.

Similar to the embodiment illustrated in FIG. 24, the switch device SW may maintain a turned-on state during the second to fourth time periods T2 to T4. Accordingly, while a readout operation related to the second to fourth time periods T2 to T4 is performed, the capacitance of a floating diffusion FD may be a sum of the first capacitance $C_{FD1}$ and a second capacitance $C_{FD2}$. Accordingly, a conversion gain of the pixel group PG may decrease during the second to fourth time periods T2 to T4.

A controller of the image sensor may calculate a difference between a reset voltage and a pixel voltage obtained in each of the first to fourth time periods T1 to T4, may obtain a pixel signal related to the pixel group PG, and may generate a result image using the pixel signal. In a readout operation related to at least one or more of the first to fourth time periods T1 to T4 included in the single pixel group PG, by increasing a conversion gain of a corresponding pixel, a dynamic range of the image sensor may improve.

Figure 26:
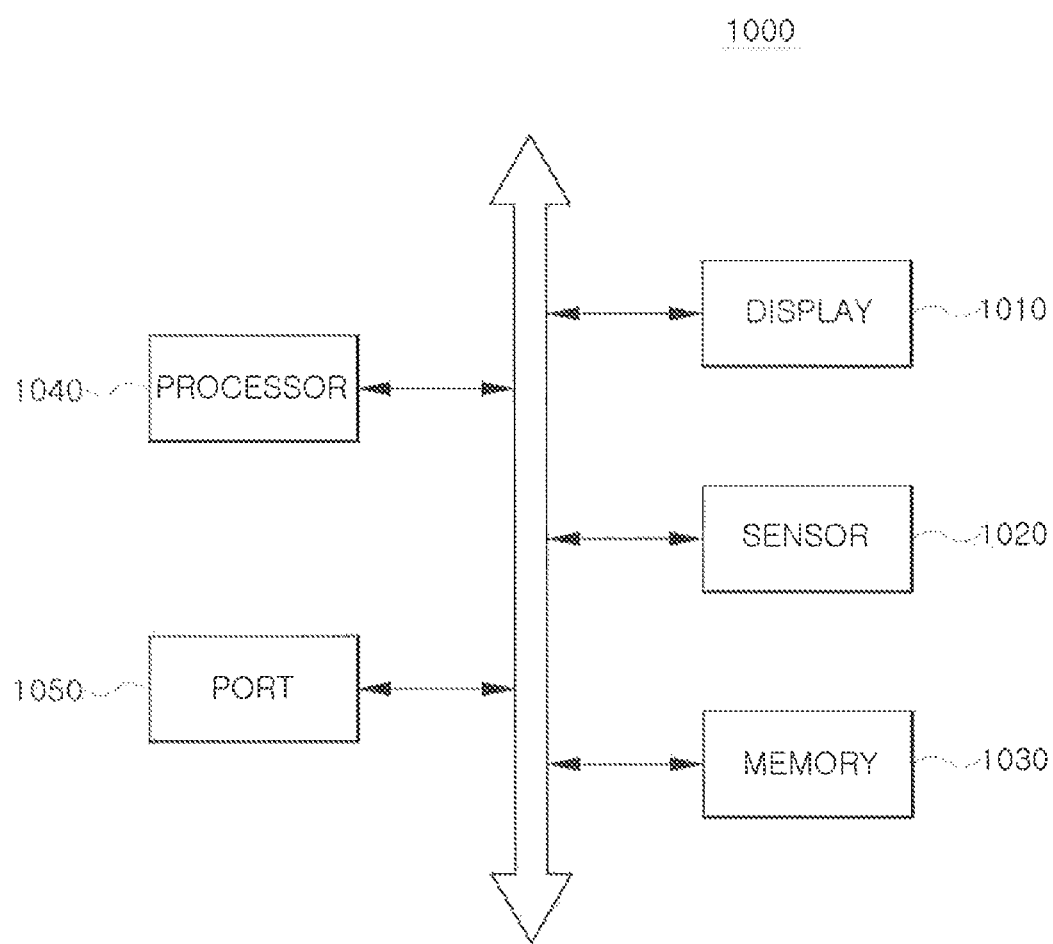
FIG. 26 is a block diagram illustrating an electronic device including an image sensor according to an exemplary embodiment of the present inventive concept.

FIG. 26 is a block diagram illustrating an electronic device including an image sensor according to an exemplary embodiment of the present inventive concept.

A computer device 1000 in the embodiment illustrated in FIG. 26 may include a display 1010, a sensor portion 1020, a memory 1030, a processor 1040, a port 1050, and other components. The computer device 1000 may further include a wired and/or wireless communication device, a power device, and others. Among the elements illustrated in FIG. 26, the port 1050 may be provided for the computer device 1000 to communicate with a video card, a sound card, a memory card, a universal serial bus (USB) device, and the like. The computer device 1000 may be a smartphone, a tablet personal computer (PC), a smart wearable device, and the like, in addition to a desktop computer or a laptop computer.

The processor 1040 may process a certain calculation or a command or may perform a task. The processor 1040 may be a central processing unit (CPU), a microprocessor unit (MCU), a system-on-chip (SoC), or the like, and may communicate with the display 1010, the sensor portion 1020, and the memory device 1030 and may also communicate with the other devices connected to the port 1050.

The memory 1030 may be a storage medium storing data or multimedia data, and the like, for operation of the computer device 1000. The memory 1030 may include a volatile memory such as a random access memory (RAM) or may include a nonvolatile memory such as a flash memory, and the like. In addition, the memory 1030 may include a solid state drive (SSD), a hard disk drive (HDD), or an optical drive (ODD) as a storing device. An input and output device may also be included in the computer device 1000 or be connected with the computer device 100 and may include an input device such as a keyboard, a mouse, a touch screen, and an output device such as a display, an audio output unit, and the like, provided to a user.

The sensor portion 1020 may include a variety of sensors such as an image sensor, a gyro sensor, a GPS sensor, an illumination sensor, and the like. An image sensor included in the sensor portion 1020 may be employed in the computer device 1000 in accordance with the exemplary embodiments described with reference to FIGS. 1 to 25.

According to the aforementioned exemplary embodiments of the present inventive concept, a result image may be generated using pixel signals obtained while conversion gains of pixels have different values. Accordingly, different conversion gains may be applied to a dark area and a bright area of an object to be imaged, thereby improving noise properties and a dynamic range of an image sensor.

While the present inventive concept has been shown and described with reference to exemplary embodiments thereof, it will be apparent to those skilled in the art that modifications and variations could be made thereto without departing from the scope of the present inventive concept as set forth by the appended claims.

What is claimed is:

1. An image sensor, comprising:
a pixel array including a plurality of pixels connected to a plurality of row lines and a plurality of column lines, each of the plurality of pixels including a photodiode for generating an electric charge in response to light, and a pixel circuit having a floating diffusion for storing the electric charge; and
a controller configured to adjust a capacitance of the floating diffusion to a first value and obtain a first sub-pixel signal from the pixel circuit during a first sub-time period, adjust the capacitance of the floating diffusion to a second value greater than the first value and obtain a second sub-pixel signal from the pixel circuit during a second sub-time period subsequent to the first sub-time period, keep the capacitance of the floating diffusion to the second value and obtain a second pixel signal from the pixel circuit during a second time period subsequent to the first sub-time period and the second sub-time period, and generate a result image based on the obtained pixel signals,
wherein the first sub-time period and the second sub-time period are included in a first time period for obtaining a pixel signal based on the electric charge generated by the photodiode during a first exposure time, and a transfer transistor connected to the photodiode is turned-on once during the first time period.

2. The image sensor of claim 1, wherein the controller generates a first image frame using the first sub-pixel signal and the second sub-pixel signal, a second image frame using the second pixel signal, and the result image using the first image frame and the second image frame.

3. The image sensor of claim 2, wherein the controller configured to keep the capacitance of the floating diffusion to the second value, obtain a third pixel signal from the pixel circuit during a third time period subsequent to the second time period, and generate a third image frame using the third pixel signal.

4. The image sensor of claim 3, wherein the controller configured to generate the result image using a first image frame generated using the first sub-pixel signal and the second sub-pixel signal, a second image frame generated using the second pixel signal, and the third image frame.

5. The image sensor of claim 1, wherein the controller configured to turn on a switch device connected between a reset transistor and the floating diffusion during the second time period.

6. The image sensor of claim 3, wherein the controller configured to obtain the second pixel signal during the second time period based on the electric charge generated by the photodiode being exposed to light during a second exposure time shorter than the first exposure time.

7. The image sensor of claim 1, wherein the controller configured to turn on once the transfer transistor during the first sub-time period, and turn off the transfer transistor during the second sub-time period.

8. The image sensor of claim 1, wherein the controller configured to turn on a switch device connected between a reset transistor and the floating diffusion during the second sub-time period.

9. An image sensor, comprising:
a pixel array including a plurality of pixel groups including a plurality of pixels connected to a plurality of row lines and a plurality of column lines, each of the plurality of pixel groups including first and second photodiodes included in the plurality of pixels for generating an electric charge in response to light, and a pixel circuit having a first transfer transistor connected between the first photodiode and a floating diffusion storing the electric charge and a second transfer transistor connected between the second photodiode and the floating diffusion; and
a controller configured to turn on the first and second transfer transistors in order to obtain pixel signals corresponding to each of the plurality of pixel groups,
wherein the pixel signals include at least a first, a second and a third pixel signal,
wherein the controller adjusts a capacitance of the floating diffusion to a first value by turning off a switch device connected between the floating diffusion and a reset transistor for obtaining the first pixel signal, and adjusts the capacitance of the floating diffusion to a second value greater than the first value by turning on the switch device for obtaining the second pixel signal, after a first exposure time for the first photodiode, wherein the controller maintains the capacitance of the floating diffusion at the second value to obtain the third pixel signal after a second exposure time for the second photodiode, and wherein the first exposure time is greater than the second exposure time.

10. The image sensor of claim 9, wherein the first and second photodiodes included in each of the plurality of pixel groups generate electric charges in response to light of the same color.

11. The image sensor of claim 9, wherein the first and second photodiodes included in each of the plurality of pixel groups share the floating diffusion, the reset transistor, and the switch device.

12. The image sensor of claim 9, wherein when the first transfer transistor included in each of the plurality of pixel groups is turned on, the second transfer transistor included in each of the plurality of pixel groups is turned off.

13. The image sensor of claim 9, wherein the first pixel signal and the second pixel signal are sequentially obtained by applying different conversion gains, and the controller is configured to turn on the switch device after obtaining the first pixel signal and before obtaining the second pixel signal.

14. The image sensor of claim 13, wherein the controller is configured to turn on the second transfer transistor for obtaining the third pixel signal after obtaining the second pixel signal.

15. The image sensor of claim 9, wherein the controller is configured to generate a group pixel signal corresponding to one pixel group using the first to the third pixel signals corresponding to each of the plurality of pixels, and generate a result image using the group pixel signal.

16. An image sensor, comprising:

a pixel array including a plurality of pixels connected to a plurality of row lines and a plurality of column lines, each of the plurality of pixels including a photodiode for generating an electric charge in response to light, and a pixel circuit having a floating diffusion for storing the electric charge; and a controller configured to obtain a first sub-pixel signal and a second sub-pixel signal from the pixel circuit during a first time period based on the charge generated by the photodiode during a first exposure time, generate a first image frame based on the first sub-pixel signal and the second sub-pixel signal, obtain a second pixel signal from the pixel circuit during a second time period, after the first time period, based on the charge generated by the photodiode during a second exposure time, generate a second image frame based on the second pixel signal, and generate a result image using the first image frame and the second image frame, wherein the second exposure time for a first row line of the pixel array begins before the end of the first time period for the last row line of the pixel array.

17. The image sensor of claim 16, wherein the first time period includes a first sub-time period and a second sub-time period after the first sub-time period, and the controller is configured to adjust a capacitance of the floating diffusion to a first value during the first sub-time period, and adjust the capacitance of the floating diffusion to a second value greater than the first value during the second sub-time period.

18. The image sensor of claim 16, wherein the controller is configured to sequentially drive a selected row line among the plurality of row lines, and start exposing light to the photodiode before obtaining a signal corresponding to the first exposure time from the last selected row line, wherein the exposing lasts for a second exposure time which is shorter than the first exposure time.

* * * * *